United States Patent
Hirota et al.

(10) Patent No.: US 7,057,144 B2
(45) Date of Patent: Jun. 6, 2006

(54) INDUCTION HEATING DEVICE

(75) Inventors: Izuo Hirota, Toyonaka (JP); Atsushi Fujita, Minoo (JP); Takahiro Miyauchi, Kobe (JP); Yuji Fujii, Kobe (JP); Akira Kataoka, Sanda (JP); Katsuyuki Aihara, Akashi (JP); Nobuyoshi Makio, Miki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/491,833

(22) PCT Filed: Feb. 21, 2003

(86) PCT No.: PCT/JP03/01958

§ 371 (c)(1),
(2), (4) Date: Apr. 5, 2004

(87) PCT Pub. No.: WO03/077599

PCT Pub. Date: Sep. 18, 2003

(65) Prior Publication Data

US 2004/0245244 A1    Dec. 9, 2004

(30) Foreign Application Priority Data

Mar. 12, 2002 (JP) ............................. 2002-066553
Aug. 13, 2002 (JP) ............................. 2002-235970
Nov. 20, 2002 (JP) ............................. 2002-336450

(51) Int. Cl.
   H05B 6/12    (2006.01)
   H05B 6/32    (2006.01)
(52) U.S. Cl. ...................... 219/624; 219/648
(58) Field of Classification Search ............ 219/624, 219/620, 670, 672, 673, 674, 675, 676, 677, 219/671, 625; 336/155, 160, 165
   See application file for complete search history.

(56) References Cited

U.S. PATENT DOCUMENTS

| | | | |
|---|---|---|---|
| 3,775,577 A | | 11/1973 | Peters, Jr. |
| 3,928,744 A | * | 12/1975 | Hibino et al. ............... 219/624 |
| 3,980,858 A | | 9/1976 | Hibino |
| 4,614,852 A | | 9/1986 | Matsushita et al. |
| 6,028,297 A | * | 2/2000 | Hamada et al. ............. 219/625 |
| 6,177,659 B1 | * | 1/2001 | Yagi et al. ................. 219/621 |
| 6,281,483 B1 | * | 8/2001 | Yagi et al. ................. 219/621 |
| 6,894,255 B1 | * | 5/2005 | Fujii et al. ................. 219/621 |

FOREIGN PATENT DOCUMENTS

| | | |
|---|---|---|
| JP | 50-82046 | 7/1975 |
| JP | 52-14944 | 2/1977 |
| JP | 61-169988 | 10/1986 |
| JP | 1-235183 | 9/1989 |
| JP | 7-211444 | 8/1995 |
| JP | 7-249480 | 9/1995 |
| JP | 8-203662 | 8/1996 |
| WO | WO 00/44201 | 7/2000 |

* cited by examiner

*Primary Examiner*—Daniel Robinson
(74) *Attorney, Agent, or Firm*—Pearne & Gordon LLP

(57) ABSTRACT

In an induction heating apparatus, in order to decrease the buoyancy exerted on an object to be heated which is made of a material having high electrical conductivity and low magnetic permeability, such as aluminum, an electrical conductor is provided between a heating coil and the object to be heated, thereby increasing the equivalent series resistance of the heating coil. Hence, the current of the heating coil, which is required for obtaining a desired heating output, is decreased, whereby the buoyancy of the object to be heated can be decreased. In addition, the electrical conductor is divided into two halves, and they are arranged in a circular arc form with a clearance provided therebetween and made close contact with the bottom face of a plate, whereby the temperature rise of the electrical conductor can be restricted. Furthermore, the heat of the electrical conductor is transferred and dissipated to the object to be heated, whereby the heating coil and the like are not damaged even if the electrical conductor is heated. An electrical conductor temperature sensor for detecting the temperature of the electrical conductor is provided; when the detection temperature becomes a predetermined tempera ture, the heating output of a drive circuit is decreased, whereby the heat generation of the electrical conductor is decreased and the heating coil and the like are not damaged by heat.

39 Claims, 22 Drawing Sheets

FIG. 19

| | OPERATION OF DRIVE CIRCUIT | DETECTION TEMPERATURE OF EACH ELECTRICAL CONDUCTOR TEMPERATURE SENSOR | DIFFERENCE BETWEEN DETECTION TEMPERATURES OF ELECTRICAL CONDUCTOR TEMPERATURE SENSORS (DIFFERENCE BETWEEN TEMPERATURES OF TWO SENSORS) |
|---|---|---|---|
| FIRST SETTING CONDITION | HEATING OUTPUT IS DECREASED FROM 2000 W TO 1600 W. | 200°C | 50K |
| SECOND SETTING CONDITION | ABNORMALITY IS INDICATED AND HEATING IS STOPPED. | 240°C | 80K |

FIG. 21
(a)
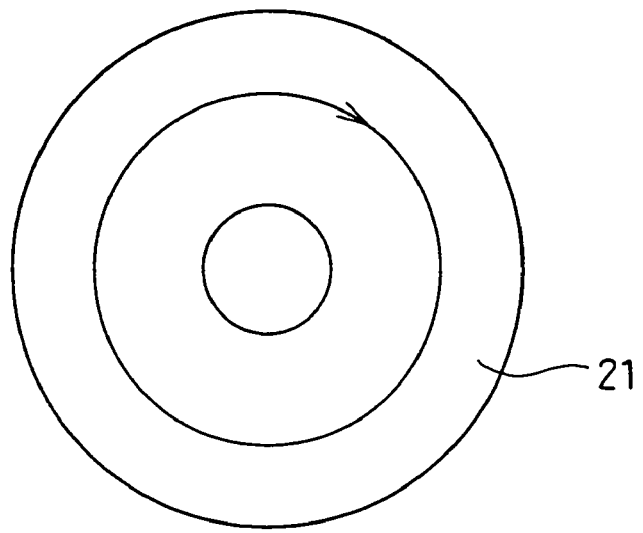
(b)
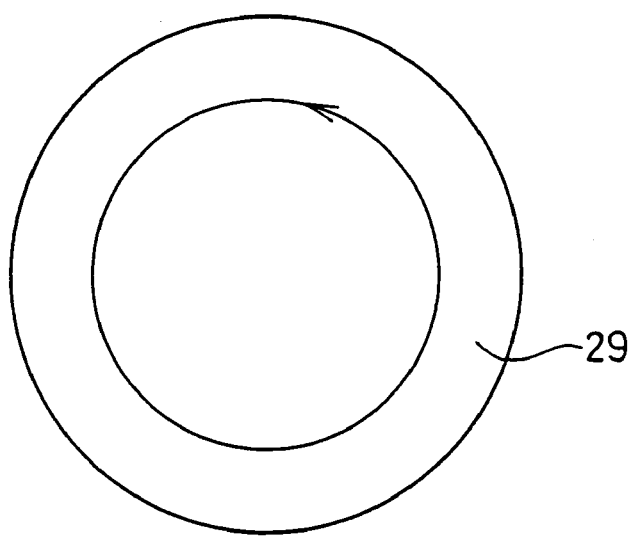

INDUCTION HEATING DEVICE

TECHNICAL FIELD

The present invention relates to an induction heating apparatus for use in general households, offices, restaurants, factories, etc. More in detail, the present invention relates to an induction heating cooker for heating an object to be heated which is made of a material having low magnetic permeability and high electrical conductivity, such as aluminum or copper, to an induction heating water heater, to an induction heating iron and to other heating apparatuses of induction heating method.

BACKGROUND ART

A conventional and general induction heating apparatus, such as an induction heating cooker, will be described referring to FIG. 20 to FIG. 22.

FIG. 20 is a cross-sectional view of a conventional induction heating cooker. In the figure, a pan or an object 1 to be heated having the shape of the pan is placed on a plate 4 provided above an induction heating section 3 having a heating coil 2. The plate 4 is, for example, an insulation plate made of a ceramic material or the like having a thickness of 4 mm and covers the upper portion of a housing 10. The heating coil 2 to which a high-frequency current is supplied from a drive circuit 5, generates a high-frequency magnetic field and provides the high-frequency magnetic field to the object 1 to be heated. Under the heating coil 2, a plurality of magnetic members 6, made of a magnetic material having high magnetic permeability, such as ferrite, are provided so that the high-frequency magnetic field generated from the heating coil 2 is directed toward the object 1 to be heated, thereby improving efficiency. On the bottom face of the plate 4, a conductive coating film 7 made of carbon or the like is formed by printing or the like. The conductive coating film 7 is connected to the earth or the input section or the output section of a rectifier (not shown) via a capacitor 8.

When a high-frequency current flows in the heating coil 2, a high-frequency magnetic field is generated around the heating coil 2, and an eddy current owing to electromagnetic induction is generated at the bottom portion of the object 1 to be heated, thereby heating the object 1 to be heated. A leak current leaking from the heating coil 2 to the earth owing to the high-frequency high voltage and stray capacitance generated in the heating coil 2 is restricted by the electrostatic shielding action of the conductive coating film 7.

In the above-mentioned conventional induction heating cooker, by the interaction between the current induced in the bottom portion of the object 1 to be heated and the current of the heating coil 2, a force of repulsion away from the heating coil 2 is generated at the bottom portion of the object 1 to be heated. In the case when the object 1 to be heated is made of a material having high magnetic permeability and relatively large resistivity, such as iron, the current value required for obtaining a desired heating output may be small, whereby this repulsion force is relatively small. In addition, in the case of iron or the like, a magnetic attraction force is exerted by the magnetic flux flowing in the object 1 to be heated, whereby there is no fear of floating or dislocating the object 1 to be heated.

In the case when the object 1 to be heated is made of a material having low magnetic permeability and high electrical conductivity, such as aluminum or copper, in order that a desired heating output is obtained, it is necessary to increase the current flowing in the heating coil 2 and to induce a large current in the object 1 to be heated. As a result, the repulsion force is increased. In addition, since such a magnetic attraction force as generated in the case of a material having high magnetic permeability, such as iron, is not exerted on the object 1 to be heated which is made of aluminum, a large force is exerted in the direction of moving the object 1 to be heated away from the heating coil 2 by the action of the magnetic field of the heating coil 2 and the magnetic field of the induction current. This force is exerted on the object 1 to be heated as buoyancy. In the case when the weight of the object 1 to be heated is light, the object 1 to be heated has a fear of being floated and moved over the placement face of the plate 4 by this buoyancy.

FIG. 21 (a) is a view seen from the side of the object 1 to be heated, showing the direction of the current flowing in the heating coil 2, and FIG. 21 (b) is a view seen from the same direction as that of FIG. 21 (a), showing the direction of the eddy current flowing in the object 1 to be heated owing to the induction of the current flowing in the heating coil 2. As shown in FIGS. 21 (a) and 21 (b), the eddy current flowing in the object 1 to be heated has a direction opposite to that of the current flowing in the heating coil 2 and has nearly the same loop shape as that of the current. These two circular currents generate the same phenomenon as that generated when the poles, having the same polarity (for example, the N pole to the N pole), of two permanent magnets having substantially the same cross-sectional area as the area of the heating coil 2 are opposed to each other. In other words, a large repulsion force is generated between the object 1 to be heated and the heating coil 2.

This phenomenon is remarkable in the case when the material of the object 1 to be heated is a substance having low magnetic permeability and high electrical conductivity, such as aluminum or copper. Although nonmagnetic stainless steel is a material having low magnetic permeability likewise, it is a material having an electrical conductivity lower than those of aluminum and copper, whereby sufficient heat generation is obtained even if the current flowing in the heating coil 21 is small. Hence, the eddy current flowing in the object 1 to be heated is small, and the repulsion force generated in the object 1 to be heated is also small.

FIG. 22 is a graph showing an example of the relationship between input power and buoyancy at the time when the object 1 to be heated which is made of aluminum is heated. In the graph of FIG. 22, the horizontal axis represents the input power (W: watt) and the vertical axis represents the buoyancy (g: gram). As known from this figure, the buoyancy increases as the input power increases; therefore, when the buoyancy exceeds the weight of the object 1 to be heated, the object 1 to be heated is dislocated or floated.

The following are examples of the prior arts regarding the floating of the object 1 to be heated in an induction heating cooker. In Japanese Laid-open Patent Application Sho 61-128492 and Japanese Laid-open Patent Application Sho 62-276787, the floating and movement of the object to be heated are detected by using a weight sensor. In Japanese Laid-open Patent Application Sho 61-71582, the position of the object to be heated is detected by using a magnetic sensor. In Japanese Laid-open Patent Application Hei 4-765633, the fact that the object to be heated is moved by buoyancy is detected by using resonance frequency detecting means.

In either of the above-mentioned prior arts, in the case when a buoyancy of a predetermined value or more is exerted on the object to be heated or when the fact that the object to be heated is floated or moved is detected, the electric power for heating is restricted or the heating itself is stopped so that further floating or movement does not occur. However, since the electric power for heating is restricted, sufficient heating power is not obtained, thereby causing a problem of getting into a situation wherein cooking is interrupted in some cases.

For example, in the case of heating an object to be heated which is a Yukihira pan made of aluminum having a weight of 300 g and supplied with water of 200 cc, 500 g in total weight, the buoyancy becomes larger than the total weight of the pan and the substance (water) to be cooked of 500 g, at an input power of about 850 W as shown in FIG. 22. Hence, the pan is floated, and it is difficult to heat at higher input power. In the case when an aluminum pan for example is detected in the above-mentioned prior arts, the input power is restricted to a value not more than the input power at which the pan is floated, 800 W for example, thereby preventing the pan from being floated. However, according to experiments conducted by the inventors, even if heating was carried out at an input power of 800 W, it was difficult to heat the above-mentioned water of 200 cc to a boiling state. Therefore, the cooker is very low in heating performance as an induction heating cooker capable of heating a pan made of aluminum.

DISCLOSURE OF THE INVENTION

The present invention is intended to provide an usable induction heating apparatus having a simple configuration, capable of decreasing the buoyancy exerted on an object to be heated, and capable of ensuring sufficient input power even if the object to be heated is lightweight.

In addition, the present invention is intended to realize an induction heating apparatus capable of stably heating an object to be heated which is made of aluminum.

Furthermore, the present invention is intended to decrease losses in the switching devices of a high-frequency circuit for supplying a high-frequency current to a heating coil for heating an object to be heated which is made of aluminum.

Moreover, the present invention is intended to provide an induction heating apparatus having a simple configuration, capable of decreasing the buoyancy exerted on an object to be heated which is made of aluminum, with uniformly and symmetrically with respect to the center of the object to be heated, and capable of ensuring heating by sufficient input power without floating of the object to be heated even if the object to be heated is lightweight.

Still further, the present invention is intended to provide an induction heating apparatus not damaging a heating coil and the like even in the case when an object to be heated which is made of aluminum is dislocated from the heating coil or when a foreign substance is trapped between the object to be heated which is made of aluminum and a plate.

The induction heating apparatus in accordance with the present invention is provided with an electrical conductor having a certain size between the heating coil and an object to be heated which is made of aluminum, copper or a low magnetic permeability material having an electrical conductivity nearly equal to or higher than those of these. By placing this electrical conductor, the above-mentioned various objects were attained phenomenologically. It is assumed that the reasons are caused by increasing the equivalent series resistance of the heating coil. In the description of the present invention, the "equivalent series resistance" is a term defined and named as follows: "the series resistance amount in the input impedance of the heating coil measured by using a frequency close to a heating frequency while the object to be heated and the electrical conductor are disposed at positions similar to those in their heating states."

It is assumed that the above-mentioned electrical conductor decreases the current of the heating coil required to obtain the same thermal output and generates a buoyancy-decreasing function of decreasing the buoyancy caused by the magnetic field generated by the heating coil and generated in the above-mentioned object to be heated. When the object to be heated which was made of aluminum, copper or a low magnetic permeability material having high electrical conductivity nearly equal to or higher than those of these was heated, the floating and the dislocation of the object to be heated were able to be prevented phenomenologically by providing the conductor. In addition, since the current was decreased, losses in the components, such as switching devices and a resonance capacitor, for supplying a high-frequency current to the heating coil were able to be decreased.

With this configuration and as an experimental result obtained by using it, even if an object to be heated which was made of aluminum was lightweight, it was not floated, whereby heating by sufficient input power was able to be ensured. Even in the case when the object to be heated which was made of aluminum was dislocated with respect to the above-mentioned electrical conductor or when a foreign substance was trapped between the object to be heated which was made of aluminum and the plate, the electrical conductor did not become a high temperature, whereby the heating coil and the like were not damaged.

The induction heating apparatus in accordance with the present invention is characterized to have a heating coil for induction heating an object to be heated which is made of aluminum, copper or a low magnetic permeability material having an electrical conductivity nearly equal to or higher than those of these, and a nonmagnetic plate having electrical insulation performance on which the object to be heated is placed. At least one electrical conductor is provided between the heating coil and the plate. At least part of the electrical conductor makes contact with the plate directly or via a member having thermal conductivity. When the object to be heated is disposed so as to be opposed to the heating coil, it is assumed that the above-mentioned electrical conductor increases the equivalent series resistance of the heating coil and carries out an action of decreasing the buoyancy caused by the magnetic field generated by the heating coil and exerted on the object to be heated.

The induction heating apparatus is preferably further provided with an electrical conductor temperature sensor for detecting the temperature of the above-mentioned electrical conductor. When the detection temperature of the electrical conductor temperature sensor becomes a predetermined temperature or more, the output of a drive circuit for supplying a high-frequency current to the above-mentioned heating coil is decreased.

With this configuration, even if an object to be heated which is made of aluminum is lightweight, it is not floated, whereby heating by sufficient input power can be ensured. The electrical conductor itself is also induction-heated and generates heat slightly. In the case when the object to be heated which is made of aluminum is dislocated with respect to the above-mentioned electrical conductor or when a foreign substance is trapped between the object to be heated which is made of aluminum and the plate, the heat of the electrical conductor is hardly dissipated via the plate to the object to be heated, and the electrical conductor becomes a high temperature. Hence, the above-mentioned electrical conductor temperature sensor for detecting the temperature of the electrical conductor is preferably provided; when the detection temperature thereof becomes a predetermined temperature or more, the output of the drive circuit for supplying a high-frequency current to the above-mentioned heating coil is decreased, whereby the temperature of the electrical conductor is lowered. Hence, the heating coil and the like can be prevented from being damaged.

An induction heating apparatus in accordance with an embodiment of the present invention comprises a heating coil for induction heating an object to be heated which is made of aluminum, copper or a low magnetic permeability material having an electrical conductivity nearly equal to or higher than those of these, and an electrical conductor provided between the heating coil and the object to be heated. According to the study accompanied by many experiments conducted by the invertors, when the object to be heated is disposed so as to be opposed to the heating coil, it is assumed that the electrical conductor increases the equivalent series resistance of the heating coil and generates a buoyancy-decreasing function of decreasing the buoyancy caused by the magnetic field generated by the heating coil and exerted on the object to be heated. It is assumed that the direction and the intensity distribution of the magnetic field generated from the heating coil are changed owing to the influence of the electrical conductor.

If there is no electrical conductor, an induction current is induced in the object to be heated so as to cancel the magnetic field generated from the heating coil. This induction current will flow in the object to be heated in a direction opposite to and parallel with the current of the heating coil. It is assumed that buoyancy is generated on the object to be heated owing to the interaction between this induction current and the magnetic field from the heating coil.

When the above-mentioned electrical conductor is present in the present invention, the magnetic field generated from the heating coil intersects the electrical conductor and the object to be heated; hence, it is assumed that induction currents are generated in both of them. The superimposed magnetic field of the magnetic field generated by the induction current induced in the electrical conductor and the magnetic field generated by the current induced in the object to be heated acts to hamper the change of the magnetic field generated from the heating coil, whereby it is estimated that the induction currents flow in the electrical conductor and the object to be heated.

In other words, it is assumed that the distribution of the current induced in the object to be heated is changed by the induction current generated in the electrical conductor. The equivalent series resistance of the heating coil is increased by this change of the current distribution; as a result, in the case when the same output is obtained, the current value flowing in the heating coil can be decreased, whereby it is assumed that the buoyancy exerted on the object to be heated is decreased. In addition, since the electrical conductor takes over part of the buoyancy exerted on the object to be heated, it is assumed that the buoyancy exerted on the object to be heated is decreased. Since the current is decreased, it can be assumed that an effect of being capable of decreasing the switching losses in the heating coil and the high-frequency components, such as switching devices and a resonance capacitor, constituting an inverter for generating a high-frequency current to drive the heating coil is obtained.

In the invention in accordance with an embodiment, the electrical conductor is formed in a nearly plate-like shape so as to be opposed to part or the whole of the heating coil. Hence, the magnetic flux generated from the heating coil intersects the electrical conductor before reaching the object to be heated, whereby the amount of the magnetic flux intersecting the electrical conductor should be increased. Therefore, it is assumed that the equivalent series resistance of the heating coil is increased. Since the electrical conductor is positioned closer to the heating coil than the object to be heated, the magnetic coupling with the heating coil is close.

The magnetic flux having turned around the electrical conductor, the magnetic flux having passed therethrough and the magnetic flux having passed through without being significantly affected by the electrical conductor reach the object to be heated, whereby it is assumed that the distribution of the induction current in the object to be heated is changed. Hence, the equivalent series resistance of the heating coil is increased, whereby the heating coil current-decreasing action and the action of decreasing the buoyancy exerted on the object to be heated can be enhanced. The effect is more significant as the area of the electrical conductor having a plate-like shape is larger. In addition, as the electrical conductor is closer to the heating coil, more amount of the magnetic flux from the heating coil passes through the electrical conductor, whereby it is assumed that the action of increasing the equivalent series resistance becomes remarkable. The surface area of the electrical conductor should be determined so that a required buoyancy-decreasing effect is obtained in consideration of conditions, such as the distance between the electrical conductor and the heating coil and the heat generation of the electrical conductor.

In the invention in accordance with an embodiment, the electrical conductor is configured so as not to cover the center of the heating coil or the vicinity thereof. Hence, the passage of the magnetic flux generated from the heating coil and going to the object to be heated is formed at the central portion or the vicinity thereof, whereby it is assumed that the magnetic field can be focused thereto. With this configuration, the significant decrease of heating efficiency owing to the provision of the electrical conductor was able to be restricted.

In the invention in accordance with an embodiment, a circulating current limiting portion for changing the distribution of the induction current flowing so as to circulate in the electrical conductor in a direction nearly parallel with the direction of the current of the heating coil is provided. This restricts the heating value that is generated when the electrical conductor is induction-heated by the current of the heating coil. In addition, in the apparatus provided with the current limiting portion, an action of increasing the equivalent series resistance of the heating coil by the electrical conductor was generated. Hence, the heating coil current-decreasing action and the action of decreasing the buoyancy exerted on the object to be heated were generated.

In the invention in accordance with an embodiment, the above-mentioned circulating current limiting portion is a notch, an opening or a slit formed in part of the electrical conductor plate. It is assumed that the circulating current limiting portion changes the direction and magnitude of the current induced in the electrical conductor by the magnetic field generated by the heating coil. Hence, it is assumed that the heating value generated in the electrical conductor can be decreased while the effect of decreasing the buoyancy exerted on the object to be heated is maintained to some extent. When a slit is provided for example, the circulating current induced in the electrical conductor is shut off by the slit, whereby it is assumed that the current is decreased and the heating value can be decreased. However, in that case, the effect of decreasing the buoyancy exerted on the object to be heated may be lowered in some cases. The magnitude of the equivalent series resistance and the heating value of the electrical conductor may become different depending on the shape of the slit, the area of the electrical conductor wherein the magnetic flux from the heating coil intersects, the material of the electrical conductor, etc. By selecting the optimum combination of these factors, the combination wherein the buoyancy-decreasing effect is made as large as possible and the heating value of the electrical conductor becomes an allowable level may be able to be determined. Since this electrical conductor is provided with a slit but not divided into a plurality of electrical conductors, it is easy to handle during assembly or the like.

In the invention in accordance with an embodiment, a plurality of electrical conductors are disposed with intervals among them. Since the intervals are provided among the plurality of electrical conductors, it is assumed that the induction current (circulating current) generated in the electrical conductors by the magnetic field of the heating coil is shut off. Hence, the heating value of the electrical conductors by induction heating may be able to be restricted, and the distribution of the current induced by the heating coil may be able to be changed. Therefore, it is assumed that the equivalent series resistance of the heating coil can be increased. As a result, the heating coil current-decreasing action and the action of decreasing the buoyancy exerted on the object to be heated can be obtained.

In the invention in accordance with claim 7 an embodiment, the thickness of the electrical conductor is made larger than the permeable depth of the high-frequency current induced by the current of the heating coil. Hence, the most part of the magnetic flux from the heating coil does not pass through the electrical conductor, whereby it is assumed that an action of changing the direction of the magnetic field intersecting the object to be heated and the direction of the induction current being induced can be obtained securely. Hence, it is assumed that the current distribution induced in the object to be heated is changed and that the equivalent series resistance of the heating coil, including the object to be heated, is increased. As a result, the decrease of the buoyancy can be obtained effectively.

In the invention in accordance with an embodiment, the electrical conductor is made of a material having low magnetic permeability. Hence, the magnetic flux is hardly absorbed by the electrical conductor, whereby it is assumed that the amount of the magnetic flux reaching the object to be heated is increased. Since the direction of the magnetic field is changed by the current induced in the electrical conductor, it is assumed that the magnetic flux can efficiently intersect the object to be heated at either the passage passing through the inside of the electrical conductor and intersecting the object to be heated or the passage turning around the electrical conductor and intersecting the object to be heated. Hence, the equivalent series resistance can be increased while the decrease of the heating efficiency is restricted.

In the invention in accordance with an embodiment, the electrical conductor is made of a material having high electrical conductivity. Hence, the induction current induced in the electrical conductor is increased. It is assumed that the degree of the change in the direction and distribution of the magnetic field is significantly increased by the increase of the induction current. Hence, it is assumed that the change of the distribution of the induction current in the object to be heated and the effect of increasing the equivalent series resistance of the heating coil due to the generation of the current in the electrical conductor are increased. In addition, the heat generation of the electrical conductor itself due to the induction current can be restricted.

In the invention in accordance with an embodiment, a main body accommodating the heating coil is provided, and an insulator is secured to the above-mentioned main body so as to be positioned between the heating coil and the object to be heated. The electrical conductor is disposed close to the heating coil on the heating coil side of the above-mentioned insulator, whereby the magnetic coupling with the heating coil is enhanced. Hence, it is assumed that the equivalent series resistance can be increased easily. In some cases, the electrical conductor is heated to a high temperature by the action of the current induced in the electrical conductor by the magnetic field of the heating coil; however, since the electrical conductor is not exposed to the surface of the insulator, there is little fear of getting burned by the direct contact of the user's hand with the electrical conductor. Moreover, since the surface of the insulator has no projections or depressions, an effect of providing good appearance is obtained.

In the invention in accordance with an embodiment, magnetic bodies having high magnetic permeability are provided under the heating coil. The above-mentioned magnetic bodies have rising portions rising toward the object to be heated under the outer circumference or outside the outer circumference of the electrical conductor. By using these magnetic bodies, it is assumed that the magnetic flux going out from the heating coil does not expand to the vicinity of the outside of the heating coil, but intensively intersects the object to be heated, whereby the heating efficiency is raised. Furthermore, it is assumed that the amount of the magnetic flux going out from the rising portions of the magnetic bodies and directly striking against the electrical conductor in the vicinity thereof is decreased; as a result, the overheating of the electrical conductor can be restricted.

In the invention in accordance with an embodiment, an opening portion is provided at the central portion of the electrical conductor, and magnetic bodies having high magnetic permeability are provided on the opposite side of the face, opposed to the object to be heated, of the heating coil. The above-mentioned magnetic bodies have rising portions rising toward the object to be heated in the vicinity of the circumferential portion of the opening portion of the electrical conductor or on the central side from the circumferential portion of the opening portion. Hence, it is assumed that the magnetic flux can efficiently intersect the object to be heated; as a result, the heating efficiency is raised. Furthermore, it is assumed that the amount of the magnetic flux going out from the rising portions of the magnetic bodies and directly striking against the electrical conductor in the vicinity thereof is decreased, whereby the overheating of the electrical conductor can be restricted.

In the invention in accordance with an embodiment, a main body accommodating the heating coil is provided, and an insulator secured to the above-mentioned main body so as to be positioned between the above-mentioned heating coil and the object to be heated is provided. Since the electrical conductor is provided on the object-to-be-heated side of the insulator, the insulation between the electrical conductor and the heating coil can be ensured by the insulator.

In the case when an object to be heated having high electrical conductivity and low magnetic permeability is heated, the buoyancy can be decreased by using an electrical conductor, and the losses in the electrical components including the heating coil in which a high-frequency current flows can be decreased. In the case when an object to be heated which is made of iron, magnetic stainless steel or nonmagnetic stainless steel is heated, the apparatus can be used without the electrical conductor. Hence, the electric power consumed by the electrical conductor does not exist, whereby the decrease in the heating efficiency of the object to be heated can be restricted.

In the invention in accordance with an embodiment, an attachment integrated with the electrical conductor is provided, and the total weight of the above-mentioned electrical conductor and the above-mentioned attachment is set at a weight wherein they are not floated even when they are heated by the heating coil in a state of being separated from the object to be heated. With this configuration, no floating occurs even in a state wherein the electrical conductor and the attachment are heated by the heating coil, whereby the feeling of uneasiness to the user can be eliminated.

If the action of decreasing the buoyancy of the electrical conductor is made sufficiently large, no matter what kind of object to be heated is placed thereon, the object to be heated is not floated, thereby being safe.

In the invention in accordance with an embodiment, the object to be heated is thermally connected to the electrical conductor. Hence, the heat of the electrical conductor can be transferred to the object to be heated. Since part of the heat generated as a result when the electrical conductor itself is induction-heated can be transferred to the object to be heated, the heat of the electrical conductor itself is effectively given to the object to be heated, whereby the efficiency of the apparatus can be prevented from lowering.

In the invention in accordance with an embodiment, the electrical conductor is mechanically connected to the object to be heated. Hence, when the object itself to be heated which is made of a material having high electrical conductivity and low magnetic permeability is induction-heated, it is assumed that the buoyancy exerted on the object to be heated can be decreased. Since the electrical conductor is integrated with the object to be heated and not separated therefrom, it is easy to handle.

In the invention in accordance with an embodiment, a temperature detector is provided on the heating coil side face of the insulator. Since the above-mentioned temperature detector is thermally connected to the electrical conductor via the above-mentioned insulator, even if the bottom of the object to be heated is not flat, the heat of the bottom face of the object to be heated is efficiently transferred to the temperature detector by the electrical conductor. Hence, the heating coil current-decreasing effect and the buoyancy-decreasing effect are obtained, whereby the temperature control performance for the object to be heated is improved.

The induction heating apparatus in the invention in accordance with an embodiment has a heating coil for induction heating an object to be heated which is made of aluminum, copper or a low magnetic permeability material having an electrical conductivity nearly equal to or higher than those of these, and a nonmagnetic plate having electrical insulation performance on which the above-mentioned object to be heated is placed. In addition, an electrical conductor is provided between the heating coil and the above-mentioned plate. At least part of the electrical conductor makes contact with the plate directly or via a member having thermal conductivity. When the object to be heated is disposed so as to be opposed to the heating coil, it is assumed that the electrical conductor increases the equivalent series resistance of the heating coil and gives an action of decreasing the buoyancy caused by the magnetic field generated by the heating coil and exerted on the object to be heated.

By providing the electrical conductor, the floating of the object to be heated is decreased effectively. It is estimated that the reason would be as described below. The magnetic field generated from the heating coil intersects the electrical conductor and the object to be heated, whereby induction currents are generated in both of them. By the superimposed magnetic field of the magnetic field generated by the induction current induced in the electrical conductor and the magnetic field generated by the current induced in the object to be heated, it is assumed that the induction currents acting to hamper the change of the magnetic field generated from the heating coil flow in the heating coil and the object to be heated. In other words, it is assumed that the distribution of the induction current of the object to be heated is changed by the induction current generated in the electrical conductor. The equivalent series resistance of the heating coil is increased by this change of the current distribution, whereby in the case when the same thermal output is obtained, the current value flowing in the heating coil is decreased. As a result, the buoyancy exerted on the object to be heated is decreased. In addition, since it is assumed that part of the buoyancy exerted on the object to be heated is shared by the electrical conductor, it is assumed that the buoyancy exerted on the object to be heated is further decreased. Since the current value can be decreased, the switching losses in the heating coil and the high-frequency components, such as switching devices and a resonance capacitor, for use in an inverter for generating a resonance current to drive the heating coil can be decreased. Furthermore, since part of the electrical conductor makes close contact with the plate, the heat generated in the electrical conductor is transferred to the plate made of porcelain or the like. Hence, the temperature rise of the electrical conductor can be restricted, whereby the adverse effect on the peripheral components due to the temperature rise can be prevented. Moreover, by pressing the electrical conductor toward the plate by using the heating coil via an insulator or by similarly pressing the electrical conductor against the plate by using a member for holding the heating coil directly or via another member, the electrical conductor is made contact with the plate, whereby the distance between the heating coil and the plate can be set accurately.

The induction heating apparatus in the invention in accordance with an embodiment is characterized in that the above-mentioned electrical conductor is bonded to the face of the above-mentioned plate on the opposite side of the face on which the object to be heated is placed.

Since the electrical conductor is made close contact with the plate by the bonding, the heat of the electrical conductor is transferred to the plate and dissipated, whereby the heat dissipation performance of the electrical conductor is improved and excessive temperature rise can be prevented. In addition, the handling of the electrical conductor after the bonding is made easy.

In the induction heating apparatus in the invention in accordance with an embodiment, the above-mentioned electrical conductor is inserted between the plate and an insulator having elasticity and thermal insulation performance. The electrical conductor is pressed toward the above-mentioned plate by the above-mentioned insulator. With this configuration, the heat of the electrical conductor can be transferred efficiently to the plate; hence, the adverse effect on the heating coil and the peripheral components owing to the temperature rise due to the transfer of the heat of the electrical conductor to them can be restricted. In addition, the temperature of the object to be heated is raised by the conducted heat, whereby the heating efficiency can be raised.

The induction heating apparatus in the invention in accordance with an embodiment comprises a heating coil for induction heating an object to be heated which is made of aluminum, copper or a low magnetic permeability material having an electrical conductivity nearly equal to or higher than those of these, and a nonmagnetic plate having electrical insulation performance on which the above-mentioned object to be heated is placed. A plurality of electrical conductors having a predetermined width and having a shape nearly conforming to the winding direction of the winding of the heating coil are provided between the heating coil and the plate while intervals are provided among them. When the object to be heated is disposed so as to be opposed to the heating coil, it is assumed that the electrical conductors increase the equivalent series resistance of the heating coil and give an action of decreasing the buoyancy caused by the magnetic field generated by the heating coil and exerted on the object to be heated.

By providing the plurality of electrical conductors, it is assumed that the induction current generated in the electrical conductors by the magnetic field of the heating coil is divided. As a result, the heat generation of the electrical conductors owing to induction heating can be restricted, and the unbalance of the buoyancy exerted on the object to be heated can be relieved. In addition, the electrical conductors having the predetermined width and having the shape aligned in the winding direction of the winding of the heating coil are disposed at a plurality of positions while intervals are provided among them. Hence, currents are efficiently induced in the electrical conductors, and the equivalent series resistance of the heating coil is increased, whereby it is assumed that the buoyancy-decreasing effect is enhanced.

The induction heating apparatus in the invention in accordance with an embodiment is characterized in that the above-mentioned plurality of electrical conductors have a nearly (substantially) uniform size and that the intervals among them are nearly uniform.

By making the size of the plurality of the electrical conductors and the intervals among them nearly uniform, it is assumed that the distribution of the magnetic flux going out from the heating coil and intersecting the object to be heated has substantially rotational symmetry. As a result, the imbalance of the buoyancy exerted on the object to be heated is small. Hence, the restriction of the heating to a low level owing to partial floating does not occur, and the sliding of the object to be heated does not occur, whereby stable and highly efficient heating can be carried out.

In the induction heating apparatus in the invention in accordance with an embodiment, the plate on which the object to be heated is placed is provided while having a predetermined interval from the heating coil. Between the heating coil and the plate, a plurality of electrical conductors are provided. The electrical conductors are dividedly disposed while intervals are provided among them. Under the above-mentioned heating coil, magnetic bodies for magnetic shielding are provided. When the above-mentioned object to be heated is disposed so as to be opposed to the above-mentioned heating coil, it is assumed that the electrical conductors increase the equivalent series resistance of the heating coil and generate the buoyancy-decreasing function of decreasing the buoyancy caused by the magnetic field generated by the above-mentioned heating coil and exerted on the above-mentioned object to be heated. The magnetic bodies are not disposed at the positions opposed to the clearances provided among the plurality of electrical conductors.

Since the magnetic bodies are not disposed at the positions opposed to the clearances, it is assumed that the magnetic field being apt to intensely leak toward the clearance portions is dispersed in other directions. As a result, the magnetic field can be made uniform.

The induction heating apparatus in the invention in accordance with an embodiment comprises a heating coil for induction heating an object to be heated which is made of aluminum, copper or a low magnetic permeability material having an electrical conductivity nearly equal to or higher than those of these, and a nonmagnetic plate having electrical insulation performance on which the above-mentioned object to be heated is placed. A plurality of electrical conductors are provided between the heating coil and the plate while intervals are provided among them. When the object to be heated is disposed so as to be opposed to the heating coil, it is assumed that the electrical conductors increase the equivalent series resistance of the heating coil and give an action of decreasing the buoyancy caused by the magnetic field generated by the heating coil and exerted on the object to be heated. A second magnetic body is provided at a position further away from the above-mentioned heating coil than a first magnetic body. The first magnetic body for magnetic shielding is disposed at a position very close to and on the opposite side of the side, opposed to the electrical conductors, of the heating coil, and the second magnetic body provided at the position further away from the heating coil than the first magnetic body is disposed. Hence, it is assumed that an action of relieving the distortion of the magnetic field distribution owing to the clearances among the above-mentioned plurality of electrical conductors is generated.

Since the second magnetic body is provided on the opposite side of the side, opposed to the electrical conductor, of the heating coil, the magnetic flux of the heating coil being unable to be absorbed by the first magnetic body is absorbed, whereby it is assumed that the leakage magnetic field can be decreased. In addition, since the second magnetic body is not in a strong magnetic field, it is assumed that the induction amount of an eddy current is small. Hence, a silicon steel plate being low in cost and high in magnetic permeability can be used instead of ferrite or the like. However, the second magnetic body is not limited to the silicon steel plate, but it should only be a magnetic body including ferrite or the like.

The invention in accordance with an embodiment comprises a heating coil for induction heating an object to be heated which is made of aluminum, copper or a low magnetic permeability material having an electrical conductivity nearly equal to or higher than those of these, and a nonmagnetic plate having electrical insulation performance on which the above-mentioned object to be heated is placed. One or a plurality of electrical conductors are provided between the heating coil and the plate. At least some of the plurality of electrical conductors make contact with the above-mentioned plate directly or via a member having thermal conductivity. When the object to be heated is disposed so as to be opposed to the heating coil, it is assumed that the equivalent series resistance of the heating coil is increased and an action of decreasing the buoyancy caused by the magnetic field generated by the above-mentioned heating coil and exerted on the object to be heated is given. Furthermore, an electrical conductor temperature sensor for detecting the temperature of the electrical conductor is provided. When the detection value of the electrical conductor temperature sensor becomes a predetermined temperature or more, the output of a drive circuit for supplying a high-frequency current to the heating coil is decreased.

With this configuration, even if an object to be heated which is made of aluminum is lightweight, it is not floated, whereby heating by sufficient input power can be ensured. The electrical conductor itself is induction-heated and generates heat slightly. In the case when the object to be heated which is made of aluminum is dislocated with respect to the electrical conductor or when a foreign substance is trapped between the object to be heated which is made of aluminum and the plate, the heat of the electrical conductor is hardly dissipated via the plate to the object to be heated, and there is a danger of heating the electrical conductor to a high temperature. In that case, when the electrical conductor temperature sensor for detecting the temperature of the electrical conductor detects a temperature not less than a predetermined temperature, the output of the drive circuit for supplying a high-frequency current to the heating coil is decreased, whereby the temperature of the electrical conductor is lowered. Hence, the heating coil and the like are not damaged.

In addition, since the temperature of the electrical conductor does not become the predetermined temperature or more, the temperatures of the plate and the like do not become the predetermined temperature or more either.

The invention in accordance with an embodiment comprises a heating coil for induction heating an object to be heated which is made of aluminum, copper or a low magnetic permeability material having an electrical conductivity nearly equal to or higher than those of these, wherein the coil wire thereof is wound in a spiral form. A nonmagnetic plate having electrical insulation performance on which the object to be heated is placed is provided above the heating coil. One or a plurality of electrical conductors are provided between the heating coil and the plate. When the object to be heated is disposed so as to be opposed to the heating coil, it is assumed that the above-mentioned electrical conductor increases the equivalent series resistance of the heating coil and gives an action of decreasing the buoyancy caused by the magnetic field generated by the heating coil and exerted on the object to be heated. The electrical conductor is provided with an electrical conductor temperature sensor for detecting its temperature at a position in the vicinity of the heating coil and on the inner circumferential side or the outer circumferential side of the above-mentioned heating coil, whichever having a smaller potential difference. When the detection value of the electrical conductor temperature sensor becomes a predetermined value or more, the output of the drive circuit for supplying a high-frequency current to the heating coil is decreased.

With this configuration, the potential of the heating coil can be made almost the same as the potential of the electrical conductor temperature sensor, whereby the insulation performance of the electrical conductor temperature sensor can be improved. In addition, with this configuration, the insulation performance can be ensured even in a state wherein part of the detection section of the electrical conductor temperature sensor is exposed.

In the invention in accordance with an embodiment, a plurality of electrical conductor temperature sensors are provided; when the highest detection temperature among their plural detection temperatures becomes a predetermined temperature or more, the output of the drive circuit for supplying a high-frequency current to the above-mentioned heating coil is decreased, and the temperature of the electrical conductor is lowered. In a state wherein the heat of the electrical conductor cannot be dissipated to the object to be heated because of the dislocation or the like of the object to be heated, the electrical conductor becomes a high temperature locally; however, since the output is controlled by using the detection output of the electrical conductor temperature sensor that detects the temperature of the local area having the high temperature, the overheating of the electrical conductor is prevented, and the components and the like in the vicinity of the electrical conductor are hardly susceptible to thermal damage and the like.

In the invention in accordance with an embodiment, when the temperature difference among the detection temperatures of the plurality of electrical conductor temperature sensors becomes a predetermined value or more, the output of the drive circuit for supplying a high-frequency current to the above-mentioned heating coil is decreased. If the object to be heated is dislocated from its proper position on the plate or if one side of the object to be heated is floated, the heat dissipation at the portion (separated portion) of the electrical conductor away from the object to be heated becomes worse, and the temperature rises significantly. As a result, the temperature of the electrical conductor temperature sensor in the vicinity of the separated portion rises. The temperature of the electrical conductor temperature sensor in the vicinity of the portion of the plate on which the object to be heated is present is kept at the predetermined temperature, since the heat dissipation from the electrical conductor to the object to be heated is maintained. As described above, when the temperatures of the electrical conductor differ locally, by detecting the temperature difference, abnormality can be detected promptly. Hence, the heat-resistant levels of the components in the vicinity of the electrical conductor can be lowered. In addition, the temperature of the portion of the plate, not making contact with the object to be heated, can be prevented from rising locally and abnormally.

In the invention in accordance with an embodiment, a heat insulator is provided on the bottom face of the electrical conductor, and the electrical conductor temperature sensors are made contact with the bottom face of the heat insulator. With this configuration, the heat of the electrical conductor is shut off to some extent by the heat insulator, whereby the adverse effect of the heat on the heating coil and the like is hardly given. Since the electrical conductor temperature sensors are made contact with the electrical conductor via the heat insulator, even if the heat-resistant temperature of the electrical conductor temperature sensors is low, a configuration conforming thereto can be obtained by adjusting the thickness and the like of the heat insulator. In addition, since the electrical conductor temperature sensors do not directly make contact with the electrical conductor, the insulation performance against the high voltage portions of the heating coil and the like is improved.

In the invention in accordance with an embodiment, extending portions are provided on the inner circumferential side or the outer circumferential side of the electrical conductor, and the electrical conductor temperature sensors are made contact with the extending portions directly or via a heat insulator. Although the electrical conductor is provided above the heating coil, the electrical conductor temperature sensors can be provided at positions away from the heating coil by providing the extending portions on the inner circumferential side or the outer circumferential side of the electrical conductor. Hence, the insulation performance between the heating coil and the electrical conductor temperature sensors can be improved. By providing the heat insulator between the electrical conductor and the electrical conductor temperature sensors, the temperature of the electrical conductor can be relieved and transmitted to the electrical conductor temperature sensors, whereby the heat-resistant temperatures of the electrical conductor temperature sensors can be lowered.

In the invention in accordance with an embodiment, a coil base for holding the heating coil is provided below the heating coil, and a coil holder for holding the heating coil is provided above the heating coil. The electrical conductor is installed on the coil holder directly or via a heat insulator, and the electrical conductor temperature sensors are installed on the coil base. The electrical conductor temperature sensors are made contact with the electrical conductor directly or via the heat insulator. With this configuration, the positional relationship of the heating coil, the electrical conductor and the electrical conductor temperature sensors is determined so that a constant dimensional relationship is always maintained on the coil base. Hence, the influence of noise or the like generated from the heating coil on the electrical conductor temperature sensors becomes stable, and the heat transfer from the electrical conductor also becomes constant, whereby the detection performance of the electrical conductor temperature sensors also becomes stable. Furthermore, since the components in the vicinity of the heating coil are integrally assembled with the coil base, the assembly performance is improved.

In the invention in accordance with an embodiment, a heating coil temperature sensor for detecting the temperature of the heating coil is installed on the bottom face of the above-mentioned heating coil. If the detection value of the heating coil temperature sensor becomes a predetermined temperature or more, the output of the drive circuit for supplying a high-frequency current to the above-mentioned heating coil is decreased. With this configuration, even if the electrical conductor temperature sensors malfunction, the heating coil temperature sensor directly detects the temperature of the heating coil; if the abnormality of the heating coil is detected, the output of the drive circuit is decreased, thereby further enhancing safety.

BRIEF DESCRIPTION OF DRAWINGS

FIG. 19 is a table showing the operation and the setting temperatures of the electrical conductor temperature sensors of the induction heating apparatus in accordance with the eighth embodiment of the present invention.

FIG. 21 (*a*) is a view showing the direction of the current flowing in a heating coil.

FIG. 21 (*b*) is a view showing the direction of the current flowing in an object to be heated.

BEST MODE FOR CARRYING OUT THE INVENTION

Hereafter, an induction heating apparatus in accordance with preferred embodiments of the present invention will be described referring to FIG. 1 to FIG. 19.

First Embodiment

A first embodiment of an induction heating apparatus in accordance with the present invention will be described referring to FIG. 1 to FIG. 7.

Figure 1:
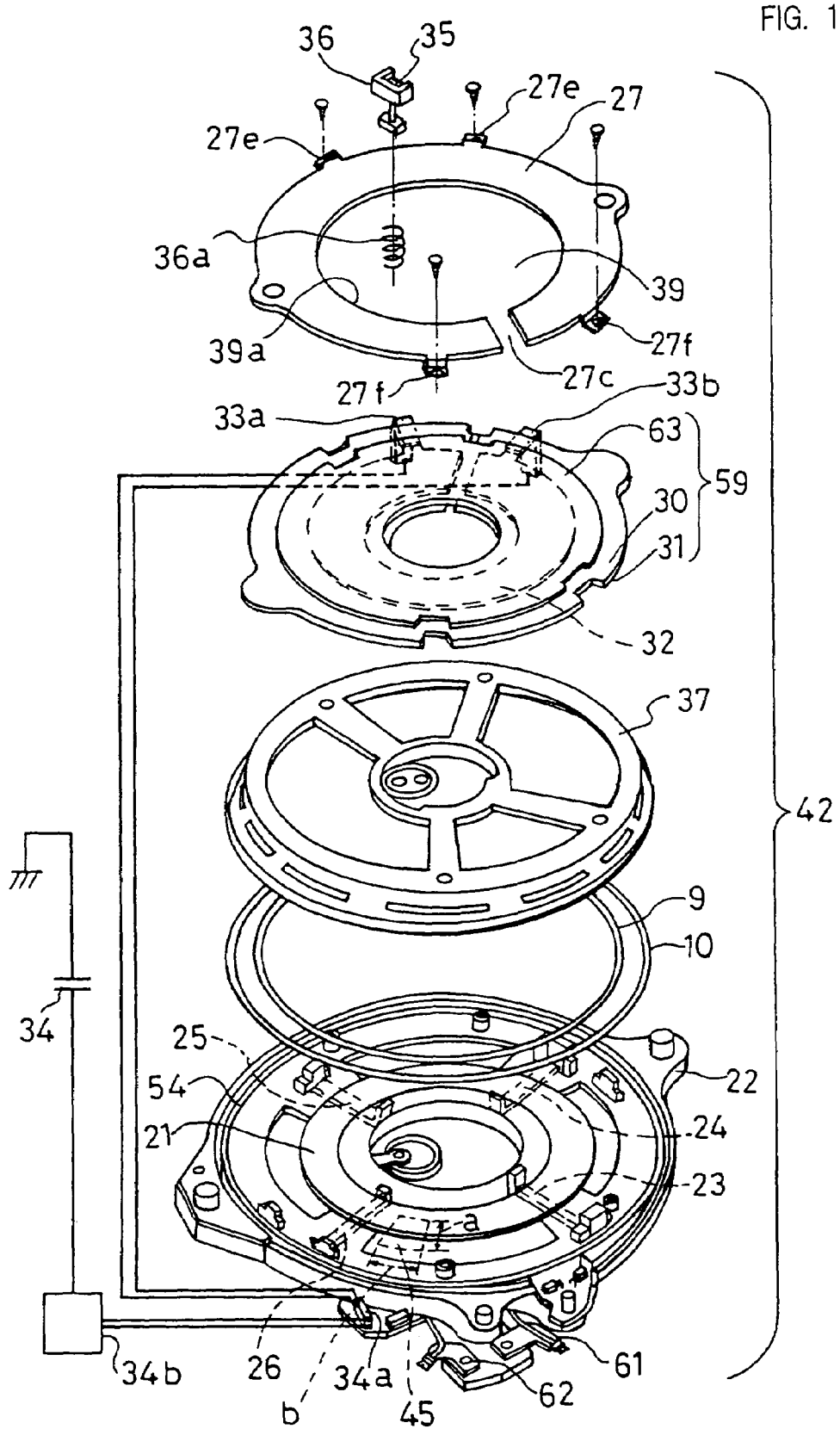
FIG. 1 is an exploded perspective view of the main sections of an induction heating section in an induction heating apparatus in accordance with a first embodiment of the present invention.
Figure 2:
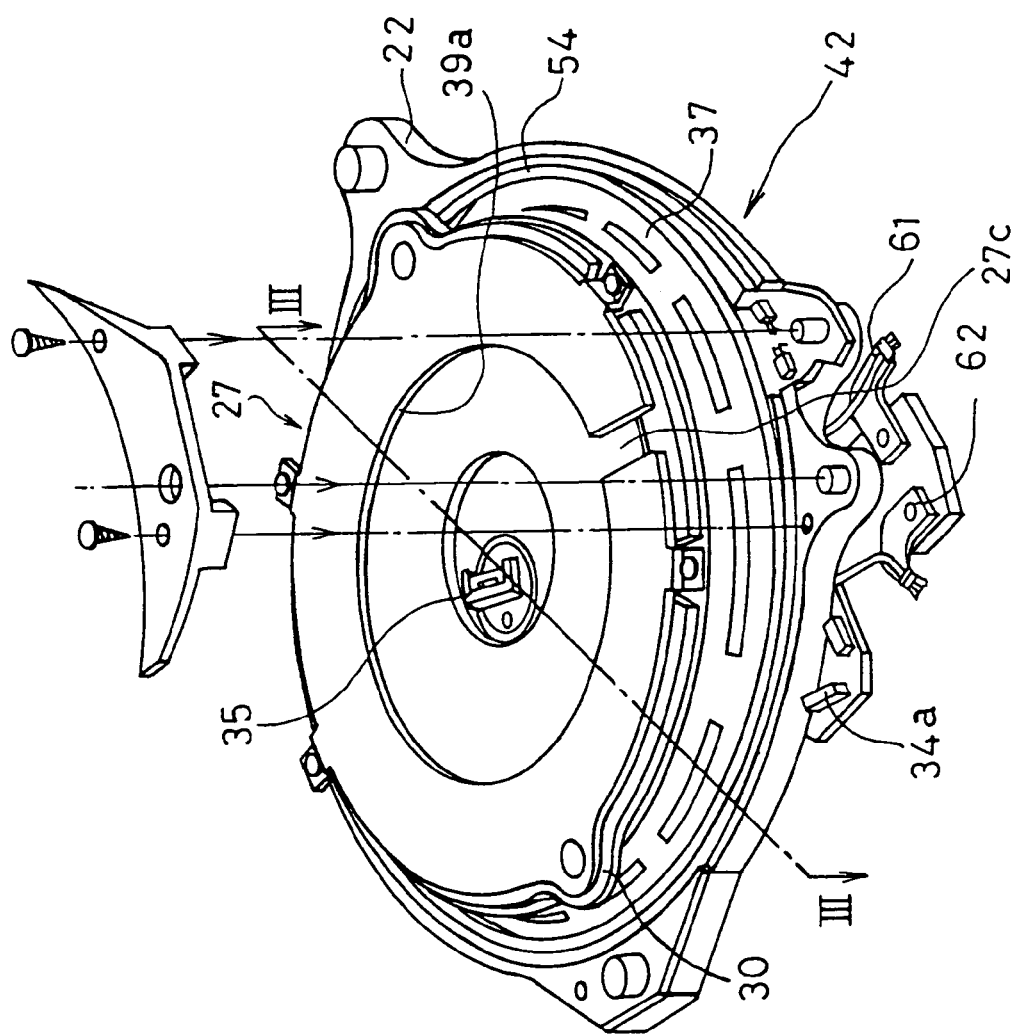
FIG. 2 is an assembled perspective view of the main sections of the induction heating section in the induction heating apparatus in accordance with the first embodiment of the present invention.
Figure 3:
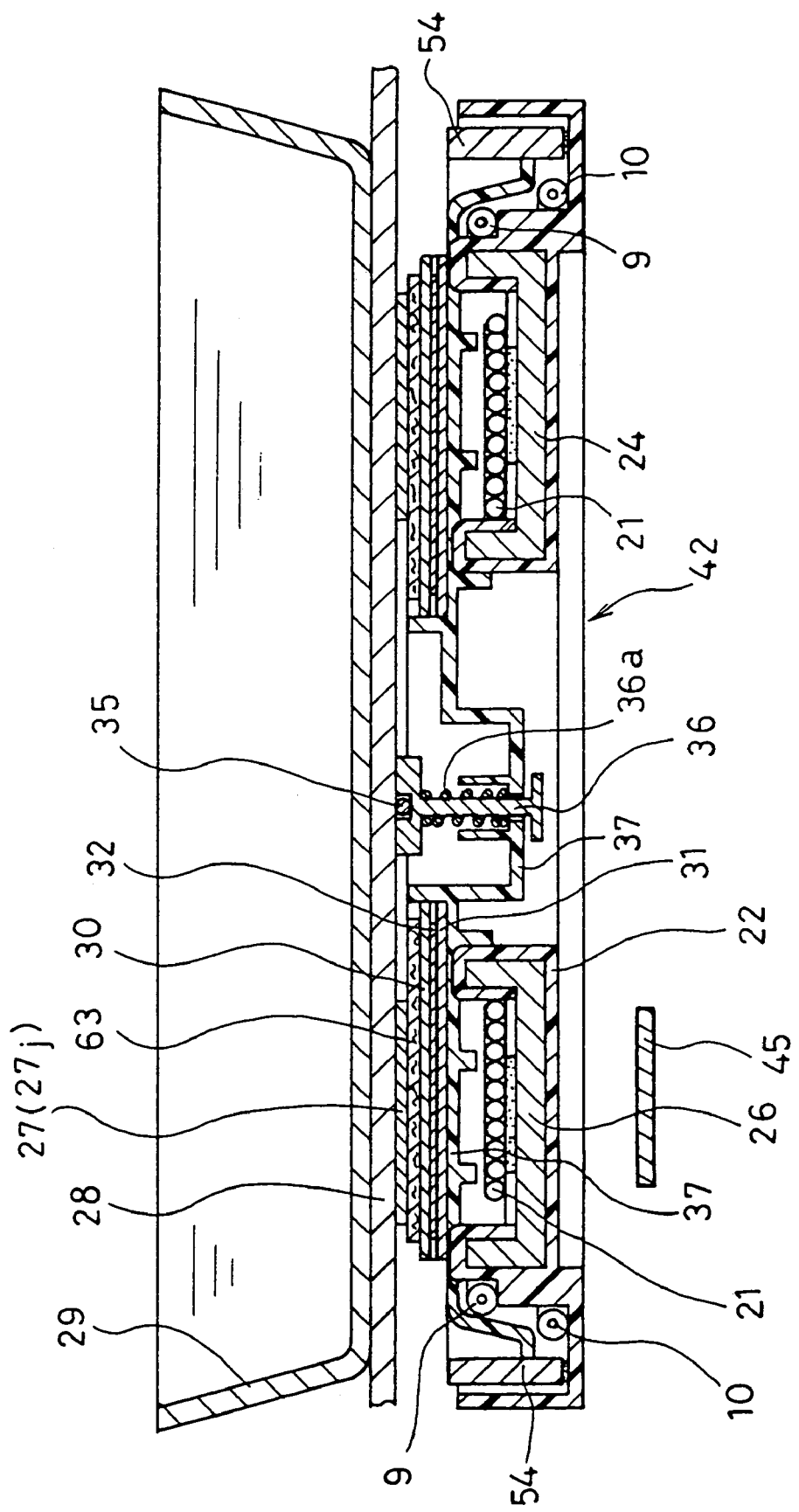
FIG. 3 is a cross-sectional view taken on line III—III of the induction heating section of FIG. 2.

FIG. 1 is an exploded perspective view showing the configuration of an induction heating section 42 including a heating coil 21 in the induction heating apparatus (for example, an induction heating cooker) in accordance with the first embodiment of the present invention, and FIG. 2 is an assembled perspective view of the induction heating section 42. FIG. 3 is a cross-sectional view showing the induction heating section 42, a plate 28 secured to the upper portion of the main body of the induction heating cooker and an object 29 to be heated which is placed on the plate 28. The object 29 to be heated is made of aluminum, copper or a low magnetic permeability material having an electrical conductivity nearly equal to or higher than those of these.

In FIGS. 1, 2 and 3, first magnetic bodies, that is, ferrite cores 23, 24, 25 and 26, serving as four ferromagnetic bodies, are disposed radially on the upper face of a coil base 22 made of a heat-resistant resin, and integrally molded in the above-mentioned coil base 22. As shown in the perspective view of FIG. 4, in each of the ferrite cores 23, 24, 25 and 26, each of ferrite cores 23b to 26b and each of ferrite cores 23c to 26c are provided at both ends of each of rod-like ferrite cores 23a to 26a, respectively, whereby the ferrite cores 23, 24, 25 and 26 are formed in the shape of the letter "U," as a whole, opening toward the heating coil 21. The coil base 22 is formed so as to cover the surfaces of the ferrite cores 23 to 26, and configured to electrically insulate the heating coil 21 from the ferrite cores 23 to 26. For the heats dissipation of the ferrite cores 23 to 26, they may be exposed partially. The heating coil 21 is a coil obtained by winding a stranded wire formed of a bundle of thin strands in the shape of a flat plate. Both terminals of the heating coil 21 are connected respectively to terminal strips 61 and 62 provided on the coil base 22. The terminal strips 61 and 62 are connected to a high-frequency power source not shown. The terminal strip 61 connected to the inner circumferential side terminal of the heating coil 21 is connected to the high-voltage side output terminal of the high-frequency power source, and the terminal strip 62 connected to the outer circumferential side terminal is connected to the low-voltage side (circuit ground or the like).

Two ring-shaped metal short-circuit lead wires 9 and 10 are provided concentrically inside the coil base 22 to reduce a leakage magnetic field. A light-emitting member 54 made of a transparent resin is provided on the further outer circumferences of the lead wires 9 and 10 inside the coil base 22. The light-emitting member 54 has a light source not shown and serves as an indication section that indicates the position of the object 29 to be heated which is shown in FIG. 3 when it is placed on the plate 28.

A coil holder 37, that is, a molded member made of a heat-resistant plastic, is provided above the heating coil 21 to hold the heating coil 21. Above the coil holder 37, a conductive film 32 made of a material, such as carbon or the like, is provided so as to be held between thermal shield plates 30 and 31 made of integrated mica. The conductive film 32 has the shape of the letter "C" of the alphabet. Two terminals 33a and 33b connected to the conductive film 32 are connected to a connector 34a. The terminals 33a and 33b are connected to a switching device 34b via the connector 34a. The switching device 34b has a function of checking the continuity between the terminals 33a and 33b and a function of connecting the terminals 33a and 33b to a capacitor 34. During the operation of the heating coil, the switching device 34b connects the terminals 33a and 33b to the capacitor 34. One terminal of the capacitor 34 is connected to the potential of a commercial power source or the potential of an output obtained by rectifying the commercial power source input to an inverter for supplying a high-frequency current to the heating coil 21 or a ground potential or any other low-potential portion.

A heat-resistant sheet 63 made of sheet-like felt or the like and having elasticity (cushion performance) is provided on the thermal shield plate 30. The thermal shield plates 30 and 31 and the heat-resistant sheet 63 constitute a heat insulator 59. An electrical conductor 27 having the shape of the letter "C" of the alphabet is provided on the heat-resistant sheet 63. The electrical conductor 27 serves as a buoyancy reducing plate. The electrical conductor 27 is made contact with or bonded to the bottom face of the plate 28 positioned thereabove on which the object 29 to be heated is placed. The electrical conductor 27 is not necessarily required to be bonded, but it may be pressed against the plate 28 directly or via a heat-conducting member having electrical insulation performance or a conductive member held therebetween. In addition, a clearance may be provided between the electrical conductor 27 and the plate 28. The material of the plate 28 is preferably heat-resistant ceramic; it has high electrical insulation performance and has predetermined thermal conductivity lower than those of metals.

The electrical conductor 27 is preferably formed into a plate made of aluminum and having the shape of the letter C, that is, the shape of a circular arc, about 1 mm in thickness and about 35 mm in width at the circular arc portion (the width in the radial direction of the circular arc). The width of the clearance 27c (gap clearance), that is, a slit, of the electrical conductor 27 is about 6 mm. The electrical conductor 27 is screwed by using the foot portions 27e and 27f thereof to the coil base 22 with the coil holder 37 held therebetween. Examples of the specific dimensions of the electrical conductor 27 are 180 mm in outside diameter and about 110 mm in inside diameter (in the case when the outside diameter of the heating coil 21 is about 180 mm and its inside diameter is about 165 mm).

Figure 4:
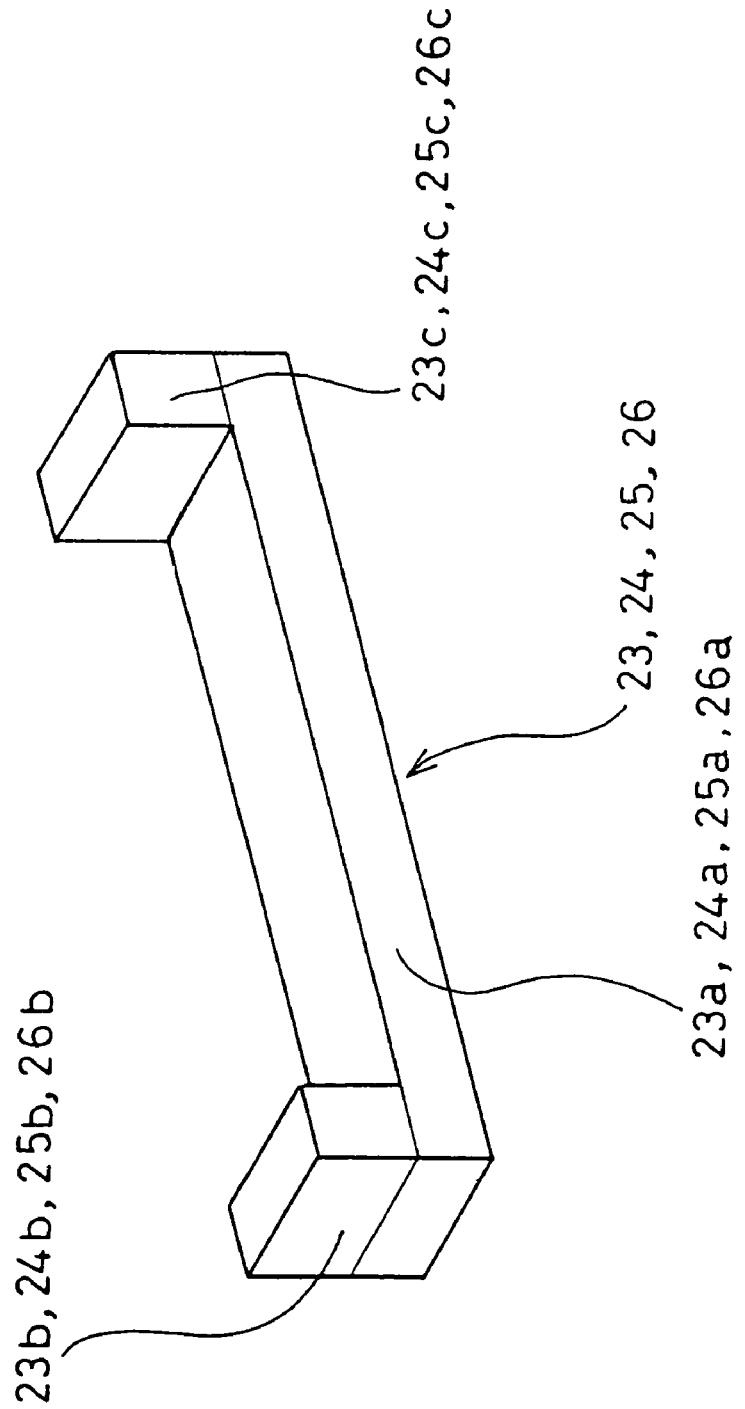
FIG. 4 is a perspective view common in ferrite cores 23, 24, 25 and 26.

In the opening portion 39 at the center of the electrical conductor 27, the upper end faces of the small ferrite cores 23b to 26b serving as the outside rising portions among the rising portions at both ends of the rod-like ferrite cores 23 to 26 shown in FIG. 4 are positioned outside the outer circumference of the electrical conductor 27. In addition, the upper end faces of the ferrite cores 23c to 26c serving as the inside rising portions are positioned inside the inner circumference of the opening portion 39.

In FIG. 3, a second magnetic body 45 is provided under the induction heating section 42. The magnetic body 45 is preferably a member made of a silicon steel plate or the like having high magnetic permeability and measuring 0.15 mm in thickness and formed in the shape of a sector, similar to a rectangle, having length "a" of about 20 mm in the radial direction and length "b" of about 15 mm in the circumferential direction as shown in FIG. 1. In the case when the magnetic field leaking from the heating coil 21 to the vicinity of the object 29 to be heated is not uniform, the magnetic body 45 is used to make adjustment so that the distribution of the magnetic field is uniform. A thermistor 35 is fitted in a holder 36 and made contact with the bottom face of the plate 28 to detect the temperature of the plate 28. The plate 28 is made of heat-resistant ceramic serving as an insulator, and the object 29 to be heated is placed on it so as to be opposed to the heating coil 21.

The operation of the induction heating apparatus in accordance with this embodiment will be described below. When a high-frequency current having a frequency of about 70 kHz is flown from a high-frequency power source not shown to the heating coil 21, the heating coil 21 generates a high-frequency magnetic field. Since the ferrite cores 23 to 26 made of a material having high magnetic permeability are provided under the heating coil 21, the magnetic flux going downward is focused by the ferrite cores 23 to 26, whereby the magnetic field can be prevented from swelling and expanding in the downward direction of the heating coil 21. In other words, the ferrite cores 23 to 26 operate to restrict losses in the downward and sideward directions of the heating coil and to raise heating efficiency.

The ferrite cores 23 to 26 described in this embodiment are respectively obtained by combining the respective three ferrite cores, that is, 23a to 23c, 24a to 24c, 25a to 25c and 26a to 26c, in the shape of the letter U as shown in FIG. 4; however, even an integrally molded ferrite core can obtain a similar action/effect if its shape is the same as that shown in FIG. 4.

Figure 8:
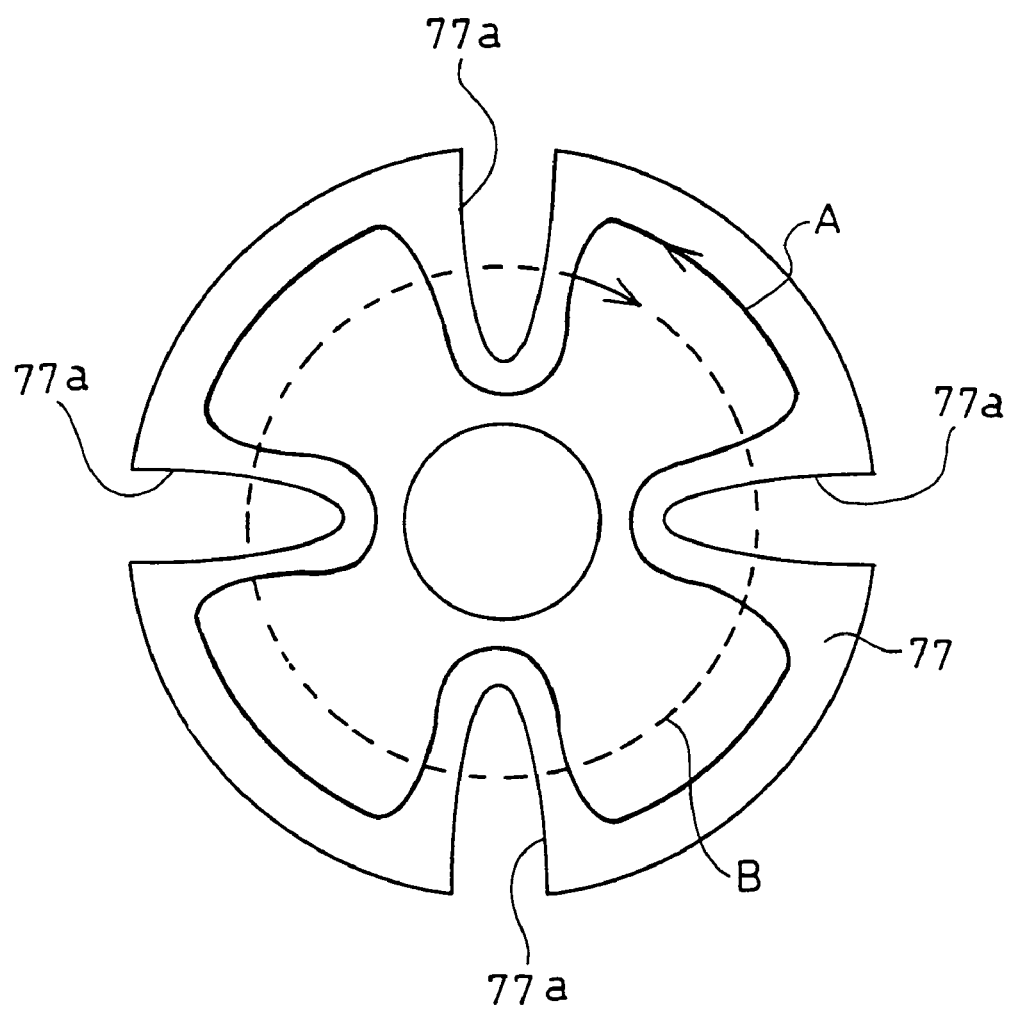
FIG. 8 is a plan view showing the electrical conductor and the current passage of an induction heating apparatus in accordance with a second embodiment of the present invention.

The magnetic flux going out in the upward direction of the heating coil 21 intersects the electrical conductor 27 (FIG. 1), and an induction current is induced in the electrical conductor 27 as indicated by curve A in FIG. 8. The thickness of the electrical conductor 27 is about 1 mm as described above, and this thickness is not less than the permeable depth of the magnetic flux. Hence, it can be assumed that the most part of the magnetic flux intersecting the electrical conductor 27 hardly passes through the electrical conductor 27 nor goes out to the opposite side, but turns around the outer or inner circumferential side, thereby being guided in the direction of the object 29 to be heated.

It is assumed that the induction current induced in the object 29 to be heated is generated when the magnetic field obtained by superimposing the magnetic field generated by the heating coil 21 and the magnetic field generated by the current induced in the electrical conductor 27 intersects the object 29 to be heated. Hence, the distribution of the current induced by the object 29 to be heated is changed by the existence of the electrical conductor 27. In addition, the inventors confirmed by experiments that the equivalent series resistance of the heating coil 21 was increased by the addition of the influence of the distribution of the current generated in the electrical conductor 27.

As the equivalent series resistance of the heating coil 21 is increased, the heating value of the object 29 to be heated is also increased while the heating coil current is the same. As a result, it has been confirmed that in the case when the same thermal output is desired to be obtained, the heating coil current can be decreased, whereby the buoyancy can also be decreased.

Figure 5:
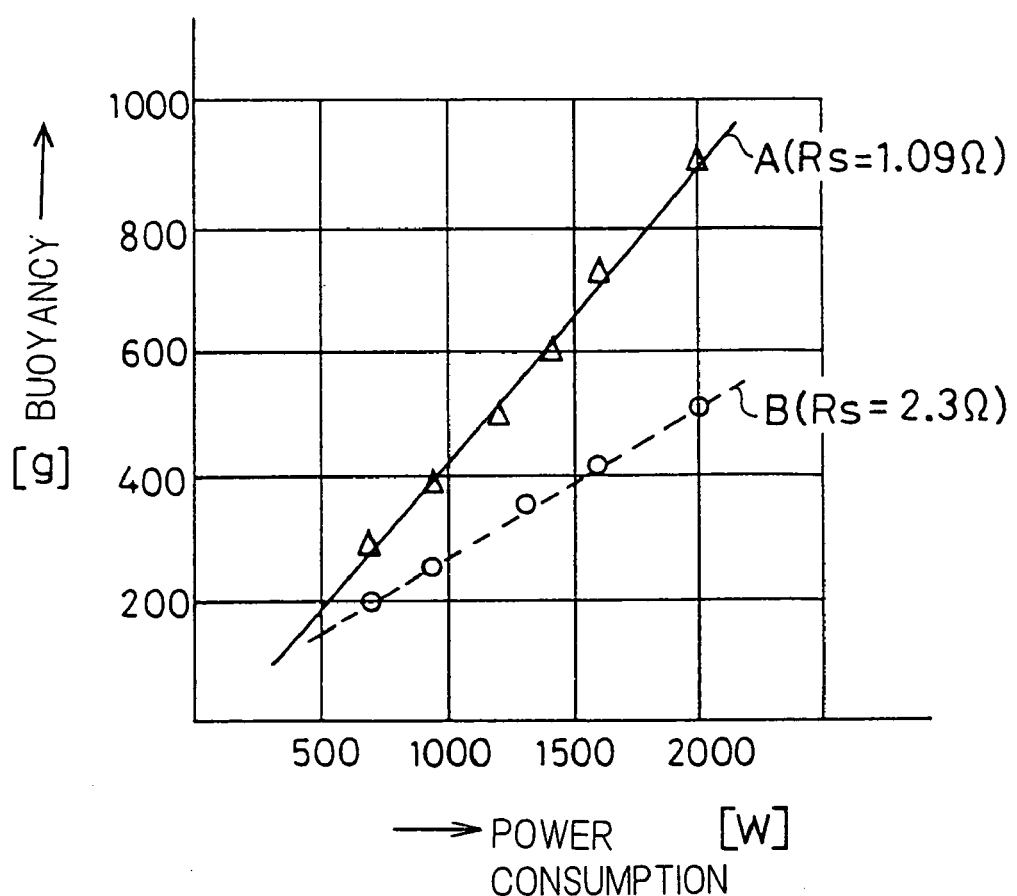
FIG. 5 is a graph showing the relationship between power consumption and buoyancy in the induction heating apparatus of the first embodiment of the present invention, the equivalent series resistance Rs of the heating coil thereof being used as a parameter.
Figure 6:
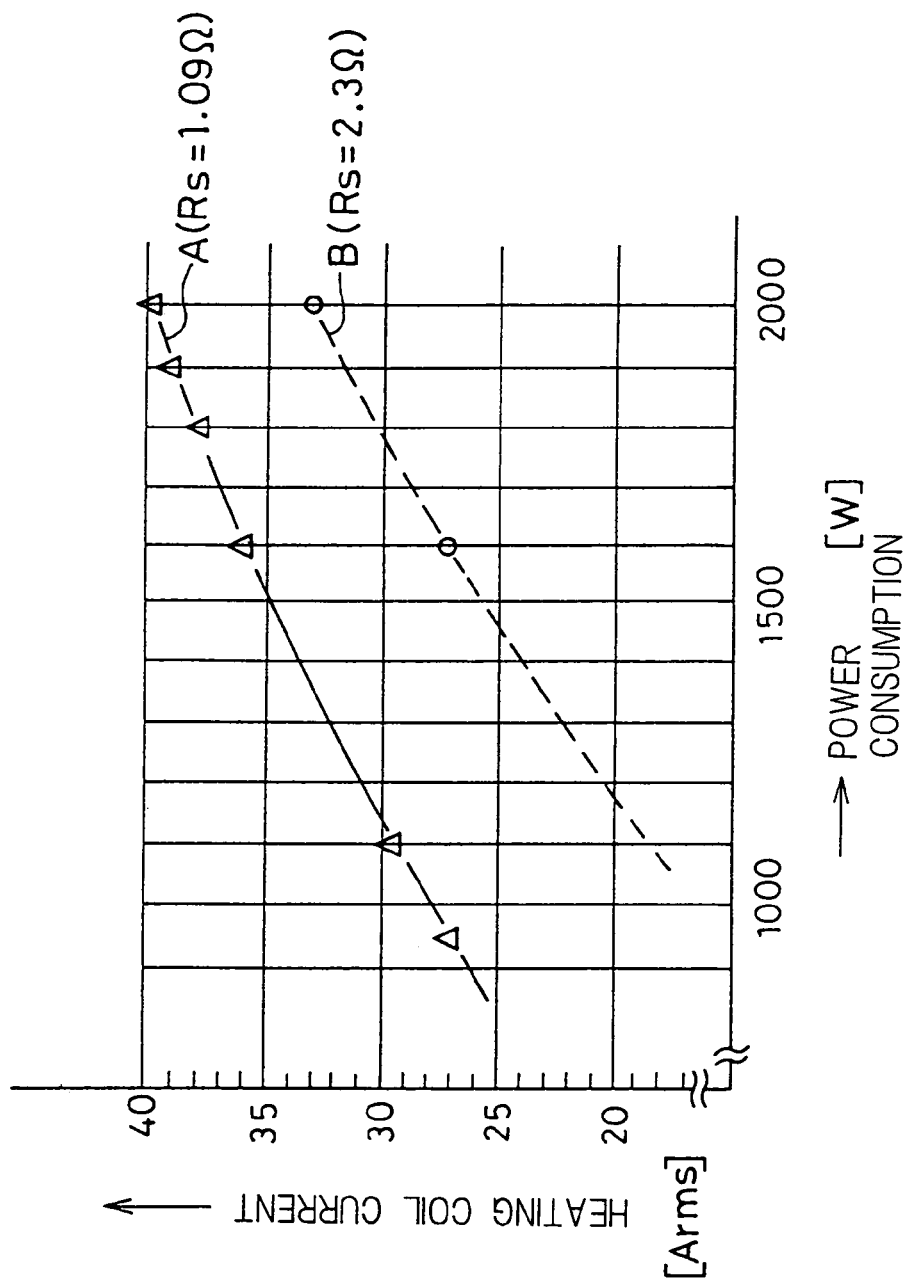
FIG. 6 is a graph showing the relationship between power consumption and heating coil current in the induction heating apparatus of the first embodiment of the present invention, the equivalent series resistance Rs of the heating coil thereof being used as a parameter.

FIG. 5 is a graph of a measurement result, showing the relationship between power consumption and buoyancy in the case when the object 29 to be heated in the induction heating apparatus in accordance with this embodiment is a pan made of aluminum. In the figure, solid line A indicates the case when the electrical conductor 27 made of aluminum is not present, and broken line B indicates the case when the electrical conductor 27 is present. FIG. 6 is a graph of a measurement result, showing the relationship between power consumption and heating coil current. In the figure, solid line A indicates the case when the electrical conductor 27 is not present, and broken line B indicates the case when the electrical conductor 27 is present. The frequency of the output of the inverter is about 70 kHz.

According to these measurement results, the equivalent series resistance (Rs) was increased from 1.09 Ω to 2.3 Ω by the insertion of the electrical conductor 27 as shown in FIG. 5. In the case when the power consumption was set at 2 kW, the buoyancy exerted on the pan was decreased from about 900 g to about 500 g. In addition, the current of the heating coil 21 was also decreased from about 40 Arms to about 33 Arms as shown in FIG. 6. As the current of the heating coil 21 was decreased, the loss in the power switching devices for driving the inverter and the loss in the heating coil 21 were decreased significantly. In the case of an object to be heated which is made of iron, the action of increasing the series resistance equivalent of the heating coil 21 by providing the electrical conductor 27 hardly occurred. Hence, even when this electrical conductor 27 is provided at all times, it causes no problem in actual use.

By providing the electrical conductor 27, a power loss is generated in the electrical conductor 27; according to experiments conducted by the inventors, it was estimated that the power loss generated by the electrical conductor 27 was about 270 W when the power consumption is 2 kW. It was estimated that the decrease of the loss inside the induction heating apparatus including the heating coil 21 was about 210 W when the electrical conductor 27 was provided. In this way, when the electrical conductor 27 is provided, although the loss due to heating therein is generated, the loss inside the induction heating apparatus is also decreased. Hence, the increase amount of the loss, obtained by subtraction, is about 60 W, whereby the decrease in heating efficiency becomes relatively small. In this way, the increase of the power loss due to the heat generation of the electrical conductor 27 is considerably counterbalanced with the decrease of the loss due to the decrease of the current of the heating coil 21.

In addition, the electrical conductor 27 may be made contact with the plate 28 as shown in FIG. 3. With this configuration, the heat of the electrical conductor 27 is dissipated to the plate 28 by heat conduction and part of the heat is given to the object 29 to be heated, whereby the temperature rise of the electrical conductor 27 can be restricted. Furthermore, the adverse effect on the components owing to the temperature rise of the peripheral components due to the heat can be prevented. By giving the heat to the object 29 to be heated, the above-mentioned decrease in heating efficiency can be compensated. Still further, by making the electrical conductor 27 into contact with the bottom face of the plate 28, the distance between the above-mentioned plate 28 and the heating coil 21 positioned by the stacking of the heat-resistant sheet 63, the thermal shield plates 30 and 31, the conductive film 32, the coil holder 37, etc. thereunder can be set accurately.

With this configuration, the heat of the electrical conductor 27 can be conducted and dissipated efficiently to the plate 28. Hence, the adverse effect of the heat generation of the electrical conductor 27 on the heating coil 21 and the peripheral components due to temperature rise can be prevented. Furthermore, the temperature of the object 29 to be heated is raised by conductive heat, whereby the heating efficiency can also be raised.

The electrical conductor 27 may be bonded to the plate 28 by using a heat-resistant adhesive. With this structure, since the electrical conductor 27 is made close contact with the plate by the bonding, the heat of the electrical conductor 27 is transferred to the plate by heat conduction and dissipated, whereby the heat dissipation performance of the electrical conductor is improved. In addition, the handling of the electrical conductor after the bonding is made easy. Furthermore, the electrical conductor 27 may be made contact with or bonded to the bottom face of the plate 28 via the conductive film 32.

The electrical conductor 27 is provided with the clearance 27c (FIG. 1 and FIG. 2) of about 6 mm in a plane opposed to the bottom face of the object 29 to be heated. The effect of increasing the equivalent series resistance (Rs) is more significant in the case when the clearance 27c is not provided. However, in the case when the clearance 27c is not provided, the induction current of the electrical conductor 27 is large, whereby the heating value becomes very large and the lowering of the heating efficiency is significant. When the clearance 27c is provided, the increase of the equivalent series resistance becomes slightly less than that in the case when the clearance 27c is not provided. However, by providing the clearance 27c, the circulating current induced in the electrical conductor 27 and flowing around the center of the heating coil 21 opposite to and nearly parallel with the current thereof is prevented from flowing. Hence, it is assumed that an induction current having a distribution different from that of the current in the case when the clearance 27c is not present flows eventually in the electrical conductor 27. As a result, an action of restricting the heat generation of the electrical conductor 27 and increasing the equivalent series resistance was generated.

The conductive film 32 held between the thermal shield plates 30 and 31 above the heating coil 21 is connected to the potential of the commercial power source, the output potential of a power source current rectifier, serving as the input potential of the inverter, or an earth potential via the capacitor 34 (FIG. 1 and FIG. 2). Hence, the leak current leaking from the heating coil 21 can be decreased. The thickness of this conductive film 32 is selected so as to have a small value of about 30 microns. Since its electrical conductivity is thus small, its induction current is very small. Hence, the action of changing the distribution of the magnetic field generated from the heating coil 21 is hardly carried out. In addition, the action of increasing the equivalent series resistance, the action of decreasing the current of the heating coil and the action of decreasing the buoyancy, generated in the case of the electrical conductor 27, were hardly generated by the conductive film 32.

Figure 7:
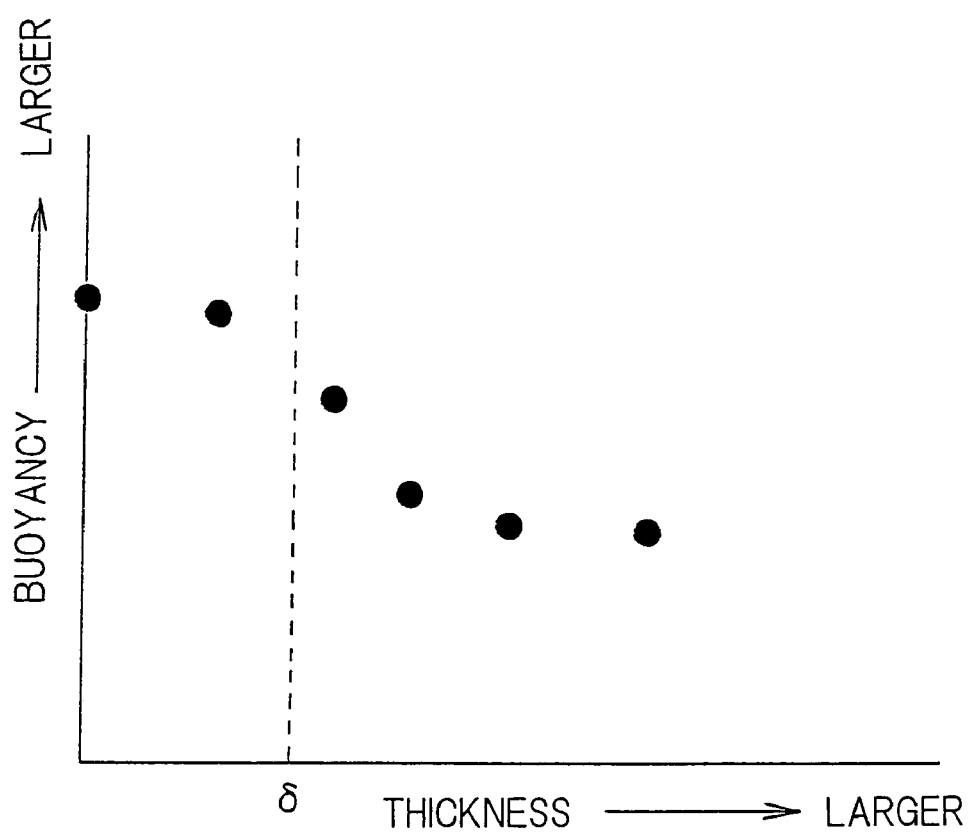
FIG. 7 is a graph showing the relationship between the thickness of an electrical conductor and the buoyancy exerted on an object to be heated in the induction heating apparatus of the first embodiment of the present invention.

FIG. 7 is a graph showing the relationship between the thickness of the electrical conductor 27 and the buoyancy. In the case when the magnetic flux going out from the heating coil 21 is shielded, the thickness of the electrical conductor 27 is required to be not less than the permeable depth of the magnetic flux. In the case of this embodiment, the frequency of the current flowing in the heating coil 21 is 70 kHz; in the case when the material is aluminum, the permeable depth δ is about 0.3 mm. Hence, the effect of decreasing the buoyancy can be obtained by setting the thickness of the electrical conductor 27 at 0.3 mm or more. The inventors have found by experiments that the thickness of the electrical conductor 27 should preferably be selected so as to be larger than the permeable depth. In other words, they have confirmed by experiments that the effect of sufficiently decreasing the buoyancy is obtained by setting the thickness at about 1 mm, a value larger than the permeable depth.

As described above, in the induction heating apparatus of this embodiment, by providing the electrical conductor 27, the equivalent series resistance of the heating coil 21 is increased when the object 29 to be heated which is made of aluminum is disposed so as to be opposed to the heating coil 21. In addition, the electrical conductor 27 has a buoyancy-decreasing function of decreasing the buoyancy caused by the magnetic field generated by the heating coil 21 and exerted on the object 29 to be heated. In other words, in the case when it is desired to obtain predetermined power consumption, the current value of the heating coil 21 can be decreased, and as the result of it, the buoyancy exerted on the object 29 to be heated is decreased. Furthermore, by the decrease of the current value, the losses generated in switching devices (not shown) inside the high-frequency power source and in the heating coil 21 are decreased, and cooling is made easy, whereby the object 29 to be heated, such as a pan made of aluminum, copper or brass having high electrical conductivity and low magnetic permeability, can be heated. Hence, it is possible to provide a safe low-priced induction heating cooker.

The electrical conductor 27 is provided between the heating coil 21 and the object 29 to be heated and covers the heating coil 21 at the portions other than the clearance 27c and the opening portion 39. Hence, part of the magnetic flux generated from the heating coil 21 intersects the electrical conductor 27 before reaching the object 29 to be heated. Therefore, an induction current flowing in the electrical conductor 27 in the direction of canceling the magnetic field that is intersecting is generated in the electrical conductor. As the result of the superimposition of the magnetic field owing to the induction current generated in this electrical conductor 27 and the magnetic field generated in the heating coil 21, part of the magnetic field generated in the heating coil 21 intersects the object 29 to be heated so as to go around the electrical conductor 27 in appearance. The interval between the electrical conductor 27 and the heating coil 21 is smaller than the interval between the electrical conductor 27 and the object 29 to be heated. Hence, the degree of the magnetic coupling between the electrical conductor 27 and the heating coil 21 is larger than the degree of the magnetic coupling between the object 29 to be heated and the heating coil 21. Generally speaking, as the magnetic coupling between the heating coil 21 and the object 29 to be heated becomes larger, the density of the magnetic flux intersecting the object 29 to be heated becomes larger when the current of the same magnitude is flown in the heating coil 21. Hence, the induction current induced in the object to be heated increases, and the equivalent series resistance of the heating coil 21 becomes larger. In other words, by providing the electrical conductor 27, the equivalent series resistance of the heating coil 21 becomes larger when the object 29 to be heated is disposed at the heating position.

As described above, the magnetic flux going out from the heating coil 21, turning around or passing through the electrical conductor 27 or not intersecting the electrical conductor 27 reaches the object 29 to be heated and contributes to the induction heating of the object 29 to be heated, whereby the effect of decreasing the current of the heating coil 21 and the effect of decreasing the buoyancy exerted on the object 29 to be heated can be enhanced.

Since the electrical conductor 27 has the opening portion 39, the vicinity of the central portion of the heating coil 21 is not covered, and the passage of the magnetic field going out from the central portion and intersecting the object 29 to be heated is ensured. Since the magnetic flux is concentrated at this passage, the significant lowering of the heating efficiency by providing the electrical conductor 27 can be restricted.

By providing the clearance 27c in the electrical conductor 27, the direction and magnitude of the current induced in the electrical conductor 27 by the magnetic field generated by the heating coil 21 is changed. Hence, while the effect of decreasing the buoyancy exerted on the object 29 to be heated is maintained to some extent, the heating value generated in the electrical conductor 27 can be decreased. The circulating current induced in the electrical conductor 27 and flowing opposite to the current flowing in the heating coil 21 is shut off by the clearance 27c. Hence, the current in the electrical conductor 27 is limited, and its heating value can be decreased. In that case, the buoyancy-decreasing effect on the object 29 to be heated is lowered to some extent. The magnitude of the equivalent series resistance and the heating value of the electrical conductor 27 become different depending on the shape of the clearance 27c, the area wherein the magnetic flux of the heating coil 21 intersects, the material of the electrical conductor 27, etc. Hence, by selecting the optimum combination of these factors, it is preferable that the optimum combination for making the buoyancy-decreasing effect as large as possible and for restricting the heating value of the electrical conductor 27 within an allowable range should be determined.

In this embodiment, the size of the electrical conductor 27 is determined so that it is opposed to the almost whole of the heating coil 21. As the plate area of the electrical conductor 27 is larger and as the electrical conductor 27 is closer to the heating coil 21, a larger amount of the magnetic flux of the heating coil 21 passes through the electrical conductor 27, whereby the action of increasing the equivalent series resistance can be enhanced. Hence, the surface area of the electrical conductor 27 should be determined so that a required buoyancy-decreasing effect is obtained and in consideration of conditions, such as the distance between the electrical conductor 27 and the heating coil 21 and the heat generation of the electrical conductor 27.

The four ferrite cores 23 to 26, serving as the magnetic bodies 23b to 26b, having high magnetic permeability and disposed radially under the heating coil 21, have the rising portions 23b to 26b rising toward the object 29 to be heated, further outside the outer circumference of the electrical conductor 27. By these rising portions 23b to 26b, the magnetic flux going out from the heating coil 21 is not extended to the vicinity of the outer circumference of the heating coil 21, but the magnetic flux intersects the object 29 to be heated without waste. As a result, the heating efficiency is raised, and the magnetic flux going out from the rising portions 23b to 26b of the ferrite cores 23 to 26 is not shut off by the electrical conductor 27. Hence, the heat generation of the electrical conductor 27 is restricted. In addition, the magnetic flux intersecting the thermistor 35 is restricted, whereby noise can be hardly induced to the detection circuit of the thermistor 35.

Furthermore, although the ferrite cores 23 to 26 in accordance with this embodiment are bent nearly orthogonally by providing rectangular ferrite cores 23b to 26b and ferrite cores 23c to 26c for both ends thereof, the bending angle is not limited to be orthogonal.

Since the thickness of the electrical conductor 27 is made larger than the permeable depth of the high-frequency current induced by the current of the heating coil, a sufficiently large induction current is generated in the electrical conductor 27, and the magnetic field from the heating coil 21 does not pass through, whereby an action of significantly changing the magnetic distribution is obtained.

Since the electrical conductor 27 is made of aluminum, it has low magnetic permeability, and the magnetic flux is hardly absorbed by the electrical conductor 27, whereby the amount of the magnetic flux reaching the object to be heated increases. Since the direction of the magnetic field is changed by the current induced in the electrical conductor, the magnetic flux can intersect the object 29 to be heated at the passage passing through the inside of the electrical conductor 27 and intersecting the object 29 to be heated or at the passage turning around the electrical conductor 27 and intersecting the object 29 to be heated. Hence, the equivalent series resistance can be increased while the decrease of the heating efficiency is restricted.

Since the electrical conductor 27 is made of aluminum, that is, a material having high electrical conductivity, the magnetic flux of the heating coil 21 intersects, whereby the degree of the change in the direction and distribution of the magnetic field is significant depending on the induction current. Hence, the effect of increasing the equivalent series resistance is enhanced by the change of the distribution of the induction current in the object 29 to be heated and the generation of the current in the electrical conductor 27. In addition, the heat generation of the electrical conductor 27 itself due to the induction current can be restricted since it has high electrical conductivity.

Since the electrical conductor 27 is provided on the bottom face of the plate 28, the electrical conductor 27 is provided closer to the heating coil 21, and the magnetic coupling with the heating coil 21 is enhanced. Hence, the equivalent series resistance can be increased easily. In some cases, the electrical conductor 27 is heated by the action of the current induced in the electrical conductor 27 by the magnetic field of the heating coil 21; however, the electrical conductor 27 is not exposed to the surface of the plate 28, there is little fear of getting burned by the direct contact of the user's hand with the electrical conductor 27. Moreover, since the surface of the plate 28 has no projections or depressions, this has an effect of providing good appearance.

The ferrite cores 23 to 26 have the rising portions at the ends, toward the object 29 to be heated, further outside the outer circumference of the electrical conductor 27. By providing these, the magnetic flux going out from the heating coil 21 does not expand to the vicinity of the outer circumference of the heating coil 21, but efficiently intersects the object 29 to be heated. As a result, the heating efficiency is raised, and the magnetic flux going out from the rising portions of the ferrite cores 23 to 26 does not strike against the electrical conductor 27, whereby the heat generation of the electrical conductor 27 is restricted.

The ferrite cores 23 to 26 have the rising portions 23c to 26c rising toward the object 29 to be heated, further close to the center from the peripheral portion 39a of the opening portion 39 of the electrical conductor 27. Hence, the magnetic flux going out from the rising portions 23c to 26c of the ferrite cores does not strike against the electrical conductor 27. Therefore, the magnetic flux from the heating coil 21 is efficiently guided to the object 29 to be heated, and the heating efficiency can be raised.

Although the electrical conductor 27 is electrically insulated from the object 29 to be heated by using the top plate 28 made of ceramic, they are connected so as to attain thermal conduction. Hence, when the electrical conductor 27 is heated, part of the heat is conducted to the object 29 to be heated via the top plate 28, whereby the decrease of the heating efficiency due to the heat generation of the electrical conductor 27 can be restricted.

Second Embodiment

An induction heating apparatus in accordance with a second embodiment of the present invention will be described referring to FIG. 8. In this embodiment, an electrical conductor 77 shown in the plan view of FIG. 8 is provided instead of the electrical conductor 27 of the induction heating section 42 in accordance with the above-mentioned first embodiment as shown in FIG. 1 to FIG. 3. The other configurations are the same as those shown in FIGS. 1 to 3.

In FIG. 8, the electrical conductor 77 is preferably provided with four wedge-shaped notches 77a in an aluminum disc preferably having a thickness of 1 mm. By providing the notches 77a in the electrical conductor 77, the passage and direction of the induction current induced in the electrical conductor 77 by the magnetic field from the heating coil 21 are indicated by curve A. Broken line B indicates the passage and direction of the current flowing in the heating coil 21. Since no current is induced at the notches 77a, the magnetic field generated from the heating coil 21 permeates them. The high current density portion of an induced eddy current flows along the notches 77a and has a distribution meandering as shown by the curve A of FIG. 8. The magnetic field of the heating coil 21 is shielded by the electrical conductor 77, turns around it and reaches the object 29 to be heated; however part of the magnetic field passes through the notches 77a and reaches the object 29 to be heated.

In the case of a conventional electrical conductor having no notches 77a, for example, a large repulsion force is generated by an induction current flowing nearly parallel with and opposite to the current flowing in the heating coil 21. However, in this embodiment, the passage of the current is deformed by the plurality of notches 77a as indicated by the curve A, whereby the repulsion force does not become so large. In addition, since the passage of the current becomes longer owing to the meandering, the resistance becomes larger. As a result, the induction current is decreased, and heat generation is reduced.

By placing the electrical conductor 77 shown in FIG. 8 in the magnetic field of the heating coil 21 and by turning part of the magnetic field therearound so as to intersect the object 29 to be heated, an induction current flowing parallel with and opposite to the current flowing in the heating coil 21 is restricted from being generated in the object 29 to be heated, whereby the equivalent series resistance can be increased. In addition, by providing the notches 77a in the electrical conductor 77, heat generation can be prevented.

The degree of the increase in the equivalent series resistance in the case when the electrical conductor 77 having the notches 77a is provided is smaller than that in the case when an electrical conductor without the notches 77a is provided. However, the equivalent series resistance is increased to some degree by providing the electrical conductor 77; hence, the current flowing in the heating coil 21 is decreased while the power consumption is the same, whereby the heat generation of the electrical conductor 77 can be restricted while the buoyancy exerted on the object 29 to be heated is decreased.

In this embodiment, the electrical conductor 77 is also heated by induction heating; however, by optimizing the specific resistance of the electrical conductor 77 and the shape of the notches 77a, the heat generation of the electrical conductor 77 can be decreased and input power to the object 29 to be heated can be increased while the equivalent series resistance is maintained large.

By the insertion of the electrical conductor 77, the equivalent series resistance of the heating coil 21 is raised; hence, in the case when the same input power is obtained, the current flowing in the heating coil 21 can also be decreased. Therefore, the loss in the heating coil 21 is decreased, and the loss in the inverter circuit (not shown) inside the high-frequency power source for supplying the high-frequency current is also decreased.

The inventors measured the equivalent series resistance on the conditions that the outside diameter of the heating coil 21 was 180 mm, that the inside diameter thereof was 50 mm, and that the distance between the heating coil 21 and the object 29 to be heated was 8 mm, when the object 29 to be heated was an aluminum pan of 240 mm in diameter. According to the measurement, the resistance was about 1.0 Ω when the electrical conductor 77 was not present. Furthermore, the resistance was about 1.7 Ω when the electrical conductor 77 was present. Hence, the current flowing in the heating coil 21 was able to be decreased from 36 Arms to 29 Arms at an input power of 1600 W. In the case of this embodiment, the high-frequency resistance of the heating coil 21 was 0.16 Ω at a frequency of 70 kHz at room temperature. Hence, it was estimated that the loss was decreased from about 207 W to 135 W at room temperature.

In this embodiment, the notches 77a of the electrical conductor are wedge-shaped so as to decrease electrical conductivity; however, the notches 77a are not limited to have this shape. A similar effect is obtained if the notches have a shape of producing an action of hampering the distribution of an eddy current that is induced in the electrical conductor by the current flowing in the heating coil and flows so as to circulate in the electrical conductor.

The object 29 to be heated is not limited to an object made of a single material, such as aluminum or copper. In the case when the object 29 to be heated has a multi-layer structure comprising a first layer preferably made of nonmagnetic stainless steel having a thickness of 0.1 mm and a second layer made of aluminum having a thickness of 1 mm, since the nonmagnetic stainless steel of the first layer is thin, heating is substantially equivalent to heating the aluminum of the second layer. Even in the above-mentioned case, the electrical conductor 77 has a similar effect.

Third Embodiment

Figure 9:
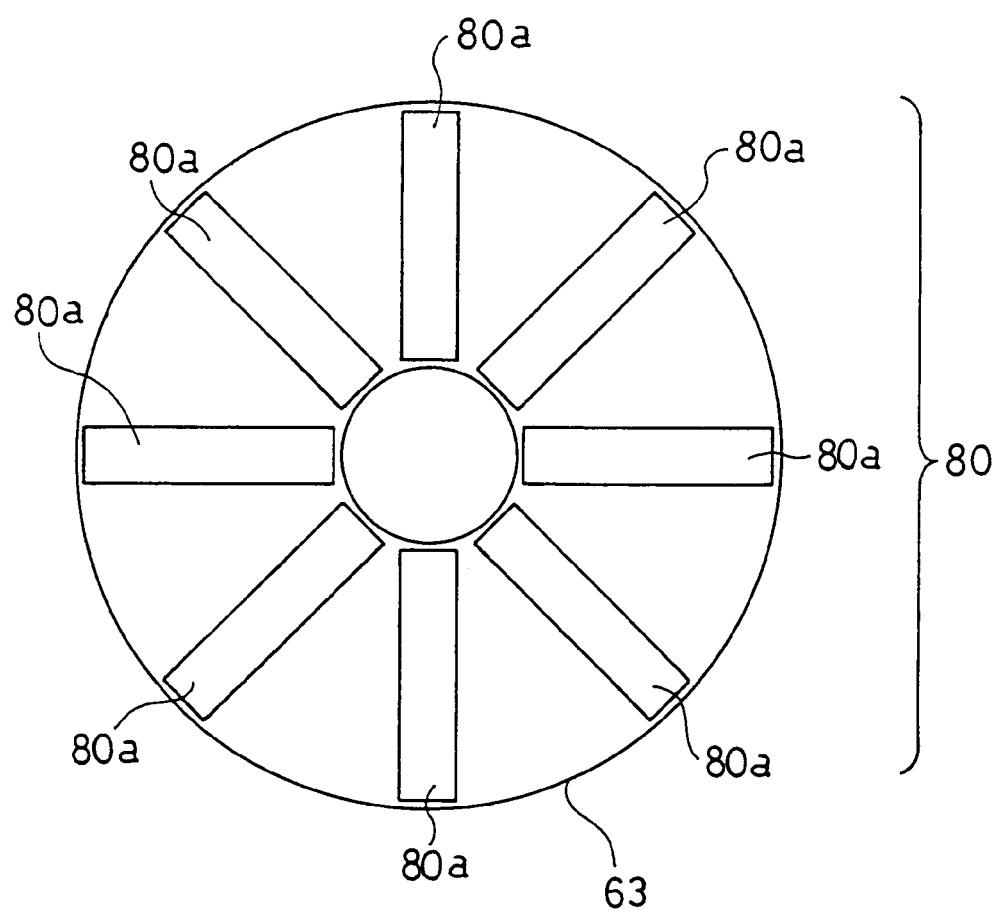
FIG. 9 is a plan view of the main sections of an electrical conductor in an induction heating apparatus in accordance with a third embodiment of the present invention.

An induction heating apparatus in accordance with a third embodiment of the present invention will be described referring to FIG. 9. In this embodiment, an electrical conductor 80 shown in the plan view of FIG. 9 is provided instead of the electrical conductor 27 of the induction heating section 42 in accordance with the above-mentioned first embodiment shown in FIG. 1 to FIG. 3. The other configurations are the same as those shown in FIGS. 1 to FIG. 3. In FIG. 9, the electrical conductor 80 is formed by radially disposing a plurality (eight in FIG. 9) of conductor plates 80a, such as strip-shaped aluminum plates preferably having a thickness of about 1 mm, a width of about 10 mm and a length of about 70 mm. The conductor plates 80a are disposed on the heat-resistant sheet 63 shown in FIG. 1 while being electrically insulated from one another. Since the conductor plates 80a disposed radially are insulated from one another, no circulating current is generated in the electrical conductor 80.

At the portions wherein the conductor plates 80a are present in FIG. 9, the magnetic field generated from the heating coil 21 is shielded, part thereof is absorbed by the conductor plates 80a, and currents are induced in the conductor plates 80a. The other part of the magnetic field turns around the conductor plates 80a and intersects the object 29 to be heated.

In this embodiment, the direction and density distribution of the eddy current (induction current) flowing in the object 29 to be heated can be made different from those of the current flowing in the heating coil 21 by the induction currents of the conductor plates 80a disposed radially. As a result, the distribution of the magnetic field intersecting the object 29 to be heated is changed, whereby the equivalent series resistance of the heating coil 21 can be increased. In addition, the temperature rise of the conductor plates 80a can be restricted.

Figure 10:
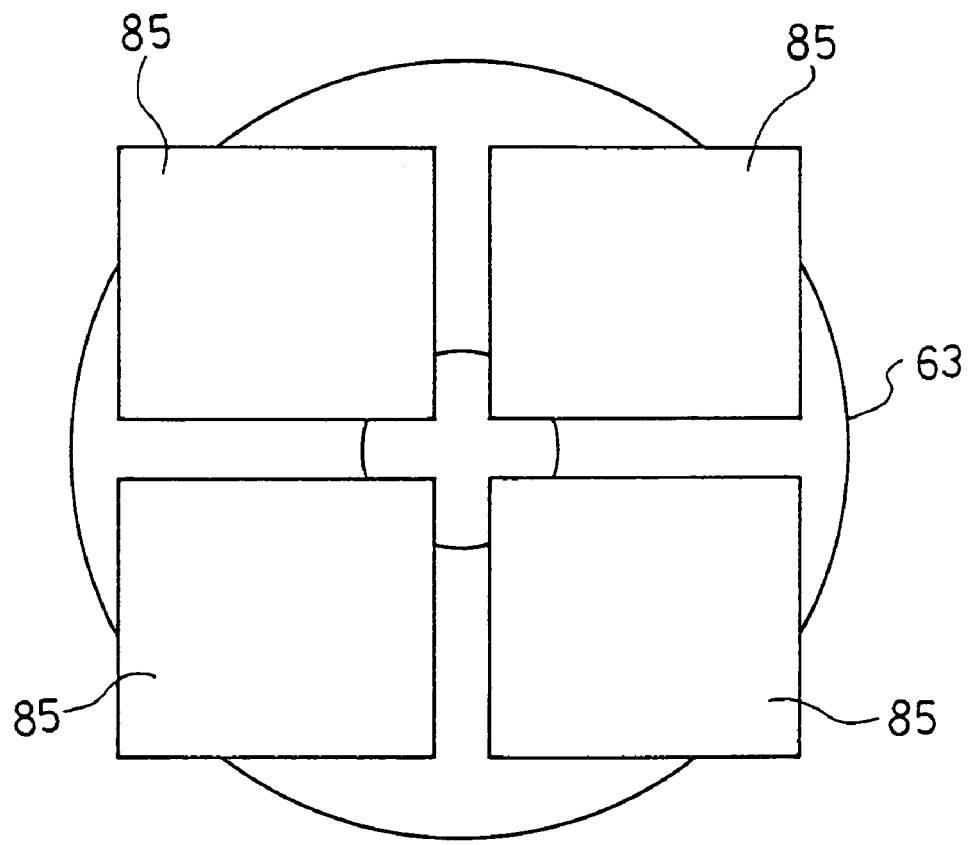
FIG. 10 is a plan view of the main sections of another electrical conductor in the induction heating apparatus in accordance with the third embodiment of the present invention.

In this embodiment, the conductor plates 80a are disposed radially; however, the embodiment is not limited to this configuration. Preferably, four square conductor plates 85 serving as electrical conductors may be arranged on the heat-resistant sheet 63 as shown in FIG. 10.

Although the number of the conductor plates 80a is eight in FIG. 9, the effect of decreasing buoyancy varies depending on the number of the conductor plates 80a. A tendency is observed where the less the number of the conductor plates 80a are used, the smaller the effect of decreasing buoyancy becomes, and the more the number, the larger the effect of decreasing buoyancy. If the number of the conductor plates 80a is increased, the total loss in the electrical conductor is increased, whereby it is necessary to carry out design so as to have an optimum number. In the present invention, the efficiency was the highest when the number was about six to eight. Although the material was aluminum, the material is not limited to this; even if a material, preferably such as copper or brass, is used, a similar effect is obtained.

Fourth Embodiment

Figure 11:
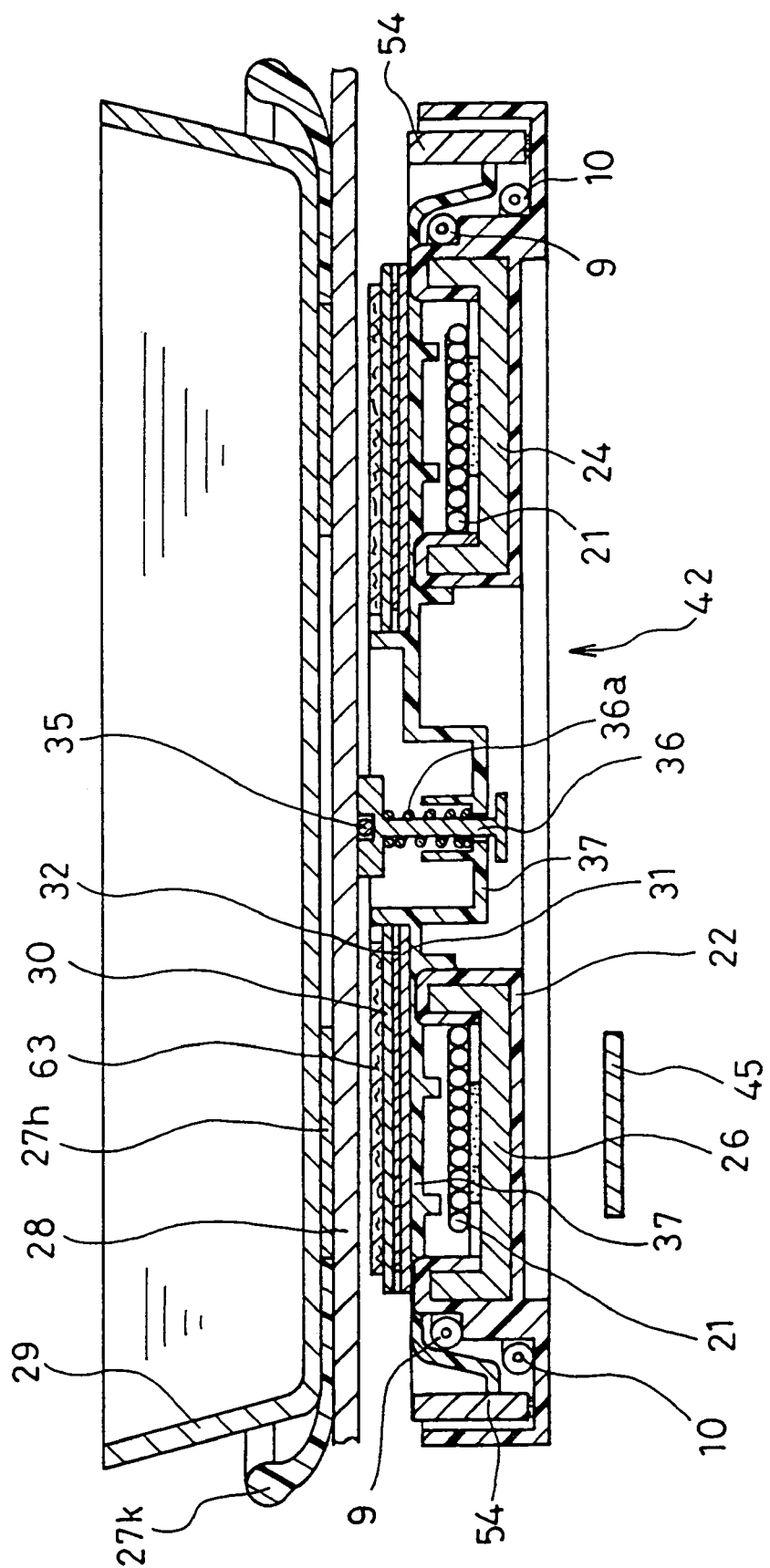
FIG. 11 is a cross-sectional view of the main sections of an induction heating apparatus in accordance with a fourth embodiment of the present invention.

An induction heating apparatus in accordance with a fourth embodiment of the present invention will be described referring to a cross-sectional view of FIG. 11. In the above-mentioned first to third embodiments, the electrical conductors 27, 77, 80 and 85, respectively corresponding thereto, were each provided between the plate 28 and the heat-resistant sheet 63 of the induction heating section 42. In the fourth embodiment, an electrical conductor 27h is detachably provided between the plate 28 and the object 29 to be heated, as shown in FIG. 11. The electrical conductor 27h is simply placed between the plate 28 and the object 29 to be heated. In the case when the object 29 to be heated is a pan or the like made of a material, such as iron, which is not floated, or even in the case when the pan is made of an aluminum pan, if it has a sufficient weight and has no fear of being floated at all, operation is carried out without the electrical conductor 27h. Hence, the energy loss due to the heat generation of the electrical conductor 27h is eliminated, and the efficiency is high. When the object 29 to be heated made of a material having high electrical conductivity and low magnetic permeability, such as aluminum or copper, and having a fear of being floated during heating is heated, the object to be heated can be prevented from being floated by carrying out operation with the electrical conductor 27h installed.

An attachment 27k having a predetermined weight may be provided for the electrical conductor 27h. A ring or the like made of heat-resistant plastic and integrally provided around the outer circumference of the electrical conductor 27h is preferable as the attachment 27k. It is desirable that the outer circumference portion of the attachment 27k is slightly bent upward and rounded so as to be easily grasped by hand. By making the total weight of the electrical conductor 27h and the attachment 27k larger than the buoyancy, the force of pushing the object 29 to be heated upward is not exerted by the electrical conductor 27h when the object 29 to be heated is heated; hence, the object 29 to be heated is hardly floated, thereby being safe.

In this embodiment, since the electrical conductor 27h makes contact with the object 29 to be heated, the heat generated in the electrical conductor 27h by the induction current is transferred to the object 29 to be heated, thereby contributing to the heating of the object 29 to be heated. Hence, the usability of the energy is raised. Furthermore, even in the case when the electrical conductor 27h is replaced with the electrical conductor 77 of the above-mentioned second embodiment or the electrical conductor 80 or 85 of the third embodiment, effects similar to those described in the respective embodiments can be obtained.

Fifth Embodiment

Figure 12:
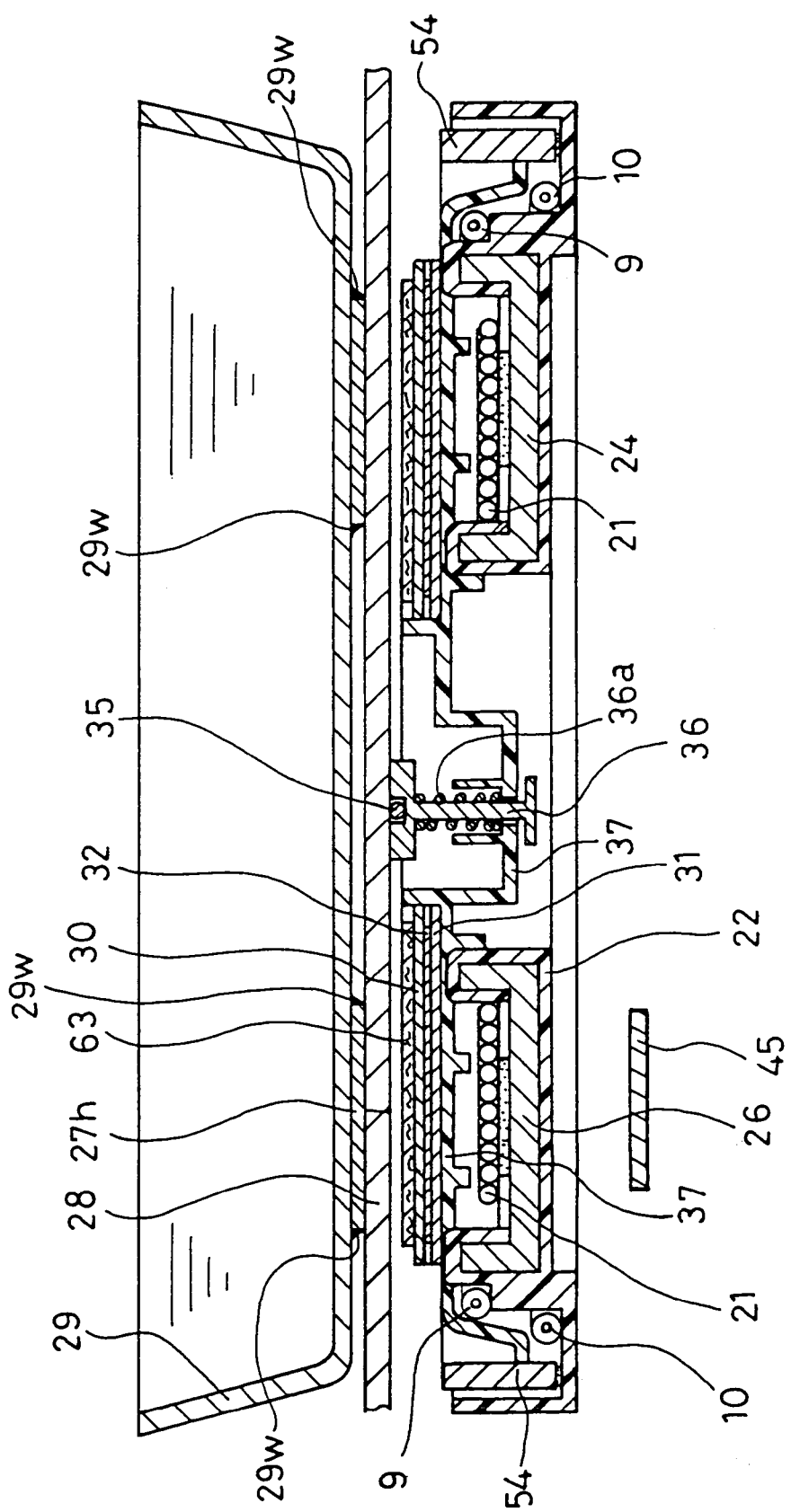
FIG. 12 is a cross-sectional view of the main sections of an induction heating apparatus in accordance with a fifth embodiment of the present invention.

An induction heating apparatus in accordance with a fifth embodiment of the present invention will be described referring to FIG. 12. In the above-mentioned fourth embodiment, the electrical conductor 27h is simply held between the object 29 to be heated and the plate 28; however, in this embodiment, the above-mentioned electrical conductor 27h is installed on the bottom face of the object 29 to be heated by using mechanical means so as to be integrated therewith. As the above-mentioned mechanical means, the electrical conductor 27h may preferably be welded by using welding portions 29w to the bottom face of the object 29 to be heated. In addition, the electrical conductor 27h may be installed on the bottom face of the object 29 to be heated by using screws, although not shown. Furthermore, it may be installed by "crimping."

In this embodiment, it is not necessary to separately place the electrical conductor 27h and the object to be heated on the plate 28 at the time of use, whereby it is possible to attain an usable induction heating apparatus. In the case when the electrical conductor 27h is installed on the object 29 to be heated by using the above-mentioned screws or the like, the electrical conductor 27h may be made attachable/detachable as necessary.

Sixth Embodiment

Figure 13:
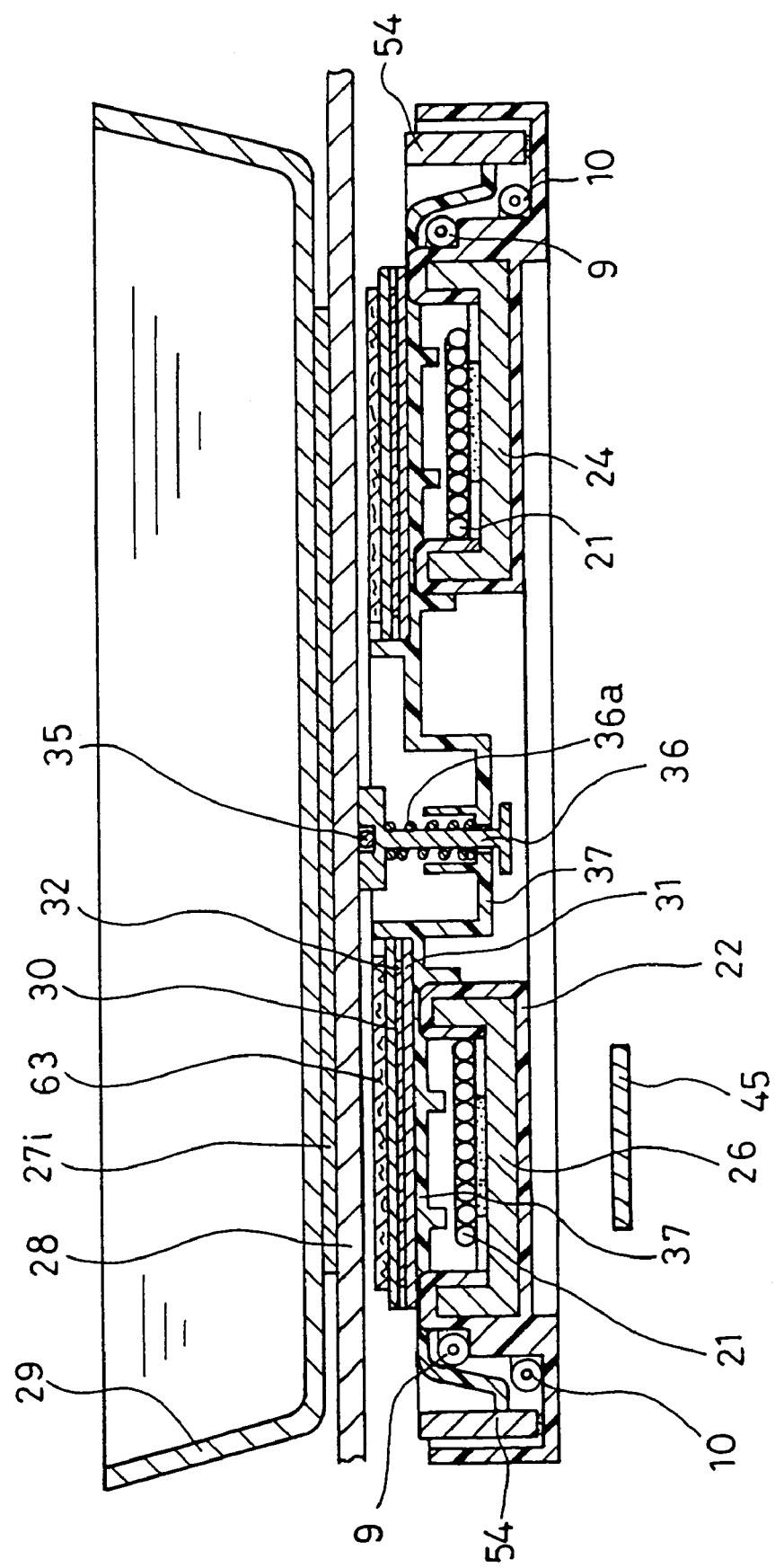
FIG. 13 is a cross-sectional view of the main sections of an induction heating apparatus in accordance with a sixth embodiment of the present invention.

An induction heating apparatus in accordance with a sixth embodiment of the present invention will be described referring to FIG. 13. In FIG. 13, an electrical conductor 27i is a disc made of aluminum, copper, brass or the like and preferably having a thickness of about 1 mm, and provided between the plate 28 and the object 29 to be heated. On the bottom face of the plate 28, a temperature detector 35 is installed while being pressed against the plate 28 by a spring 36a so as to be able to measure the temperature of the plate 28. The temperature detector 35 indirectly detects the temperature of the object 29 to be heated via the electrical conductor 27i and the plate 28. Although a thermistor is preferably used for the temperature detector 35, any device capable of performing temperature detection may be used.

In this embodiment, the electrical conductor 27i functions as a heat-collecting plate and transfers the heat of the object 29 to be heated to the plate 28. Hence, even if the bottom face of the object 29 to be heated is not flat but warped and thereby being away from the electrical conductor 27i in the vicinity of the temperature detector 35, the temperature of the object 29 to be heated can be detected at high responsivity. Since the temperature detector 35 can accurately detect the temperature of the electrical conductor 27i, when the electrical conductor 27i is overheated, its state can be detected at high accuracy. In this embodiment, the control of the current of the heating coil 21, the control of the buoyancy exerted on the object 29 to be heated and the control of the temperature can be carried out by using the detection value of the temperature detector 35. Furthermore, a function of controlling the temperature of the plate 28 so that the user is not get burned even if he touches the plate 28, a function of displaying burn injury preventive precautions at the time of the overheating of the plate 28, and other functions can be added by using this detection value.

Seventh Embodiment

An induction heating apparatus in accordance with a seventh embodiment of the present invention will be described referring to FIG. 14.

Figure 14:
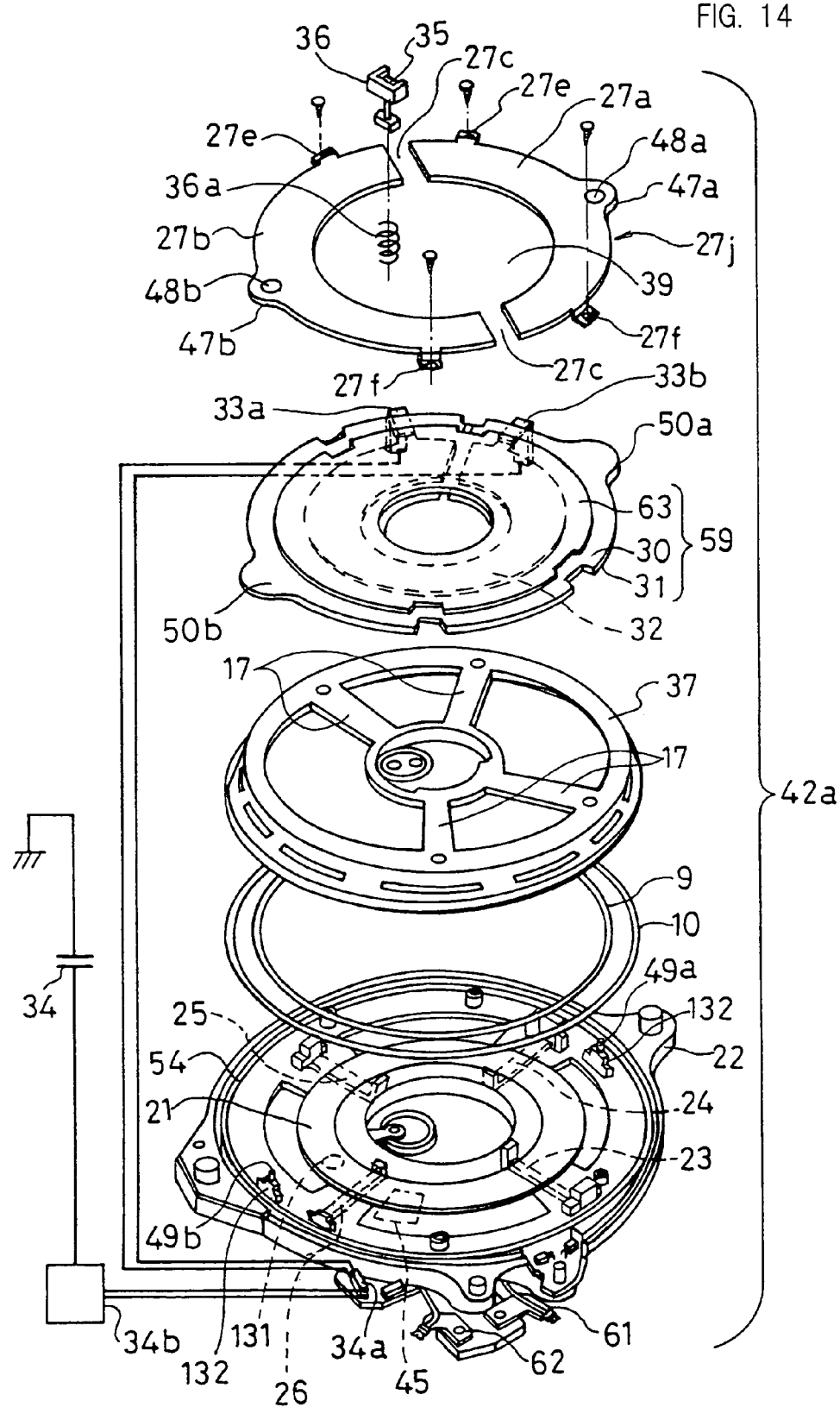
FIG. 14 is an exploded perspective view of the main sections of an induction heating section in an induction heating apparatus in accordance with a seventh embodiment of the present invention.

FIG. 14 is an exploded perspective view showing the configuration of an induction heating section 42a including the heating coil 21 in the induction heating apparatus (for example, an induction heating cooker) in accordance with the seventh embodiment of the present invention, and the main sections thereof are common to those in accordance with the above-mentioned embodiment 1 shown in FIG. 1. FIG. 14 differs from FIG. 1 at the following points. In other words, an electrical conductor 27j corresponding to the electrical conductor 27 shown in FIG. 1 comprises two semicircular electrical conductor halves 27a and 27b. In addition, two electrical conductor temperature sensors 49a and 49b for detecting the temperature of the electrical conductor 27j are provided on the coil base 22. The electrical conductor temperature sensors 49a and 49b will be described in detail in the next eighth embodiment. Since the other configurations shown in FIG. 14 are the same as those shown in FIG. 1, their overlapping explanations are omitted.

The electrical conductor 27j comprising the electrical conductor halves 27a and 27b corresponds to the electrical conductor 27 shown in the cross-sectional view of FIG. 3, and it will be described below using FIG. 3. As shown in FIG. 3, the electrical conductor 27j is pressed against and made close contact with the bottom face of the plate 28, which is above the electrical conductor and on which the object 29 to be heated is placed, directly or via a member (not shown) transferring heat and yet having electrical insulation performance or a conductive member. The electrical conductor 27j may be bonded to the bottom face of the plate 28.

The number of divisions of the electrical conductor 27j is not limited to two, but may be divided into a larger number of divisions. It is desirable that each of many (a plurality of) divisions of the electrical conductor has a nearly uniform size and that the intervals among them are nearly uniform in order that the floating force exerted on the object to be heated is uniformly distributed and the heating power is uniformly distributed around the center. In the case of the apparatus using the single electrical conductor 27 having the shape of the letter C just as in the case of the first embodiment, the floating restricting force was not uniform around the center, whereby there were problems of floating part of the object to be heated and sliding the object to be heated sideways in a certain direction.

Since the electrical conductor 27j is divided into a plurality of divisions in this embodiment, the induction current generated in the electrical conductor 27j by the magnetic field of the heating coil is divided, whereby the heat generation of the electrical conductor 27j due to induction heating can be restricted. In addition, the distribution of the induction current induced by the magnetic field of the heating coil in the object to be heated is changed, whereby the equivalent series resistance of the heating coil is increased. As a result, the current of the heating coil is decreased, and the buoyancy exerted on the object 29 to be heated is also decreased. Furthermore, the electrical conductors 27j have a predetermined width, have a shape aligned in the winding direction of the winding of the heating coil and are disposed with intervals among them. Hence, the current is efficiently induced in the electrical conductor, and the equivalent series resistance is increased, whereby the buoyancy-decreasing effect is enhanced.

By making the size of the plurality of the electrical conductor halves 27a and 27b and the intervals among them nearly uniform, the distribution of the magnetic flux going out from the heating coil and intersecting the object to be heated has substantially rotational symmetry. As a result, the buoyancy exerted on the object to be heated is distributed in balance around the center.

In addition, it is desirable that the ferrite cores 23 to 26 are disposed so as not to be opposed to the clearances among the plurality of divisions of the electrical conductor 27j. With this disposition, the magnetic field intensified at the clearances is dispersed in other directions, whereby the magnetic field can be made uniform.

Each of the electrical conductor halves 27a and 27b is an aluminum plate having a thickness of about 1 mm and a width of about 35 mm and being formed into a semicircular arc. The clearance 27c between the electrical conductor half 27a and the electrical conductor half 27b is about 10 mm. The electrical conductor halves 27a and 27b are secured to the coil base 22 with screws at the foot portions 27e and 27f thereof while the coil holder 37 is held therebetween. Examples of the specific dimensions of the electrical conductor 27j are 180 mm in outside diameter and about 110 mm in inside diameter (in the case when the outside diameter of the heating coil 21 is about 180 mm and the inside diameter thereof is about 165 mm).

The upper end faces of the ferrite cores 23b to 26b serving as the outside rising portions of the ferrite cores 23 to 26 shown in FIG. 4 are positioned outside the outer circumference of the electrical conductor 27j. Furthermore, the upper end faces of the ferrite cores 23c to 26c serving as the inside rising portions are positioned inside the inner circumference of the opening portion 39.

The operation of the induction heating apparatus having the induction heating section 42a in accordance with this embodiment shown in FIG. 15 will be described below using FIG. 3. When a high-frequency current having a frequency of about 70 kHz is flown from a high-frequency power source not shown to the heating coil 21, the heating coil 21 generates a high-frequency magnetic field. Since the ferrite cores 23 to 26 made of a material having high magnetic permeability are provided under the heating coil 21, the magnetic flux going downward is focused by the ferrite cores 23 to 26, whereby the magnetic field is prevented from expanding in the downward direction of the heating coil 21. In other words, the ferrite cores 23 to 26 operate to restrict losses in the downward and sideward directions of the heating coil and to raise the heating efficiency.

The magnetic flux going out in the upward direction of the heating coil 21 intersects the electrical conductor 27j, and an induction current is induced in the electrical conductor 27j. The thickness of the electrical conductor 27j is about 1 mm as described above and not less than the permeable depth of the magnetic flux; hence, the most part of the magnetic flux intersecting the electrical conductor 27j hardly passes through the electrical conductor 27j, but turns around the outer or inner circumferential side, thereby being guided in the direction of the object 29 to be heated.

The induction current induced in the object 29 to be heated is generated when the magnetic field obtained by superimposing the magnetic field generated by the heating coil 21 and the magnetic field generated by the current induced in the electrical conductor 27j intersects the object 29 to be heated. Hence, the distribution of the current induced by the object 29 to be heated is changed by the existence of the electrical conductor 27j. In addition, the equivalent series resistance of the heating coil 21 is increased by the addition of the influence of the distribution of the current generated in the electrical conductor 27*j*.

As the equivalent series resistance of the heating coil 21 is increased, the heating value of the object 29 to be heated is increased while the heating coil current is the same. As a result, in the case when the same thermal output is desired to be obtained, the heating coil current can be decreased, whereby the buoyancy is also decreased.

The electrical conductor 27*j* may be bonded to the bottom face of the plate 28 by using a heat-resistant adhesive. In that case, the electrical conductor 27*j* is made close contact with the plate by the bonding, whereby the heat of electrical conductor 27*j* is transferred to the plate by heat conduction and the heat dissipation performance of the electrical conductor 27*j* is improved. In addition, the handling of the electrical conductor 27*j* in the production processing thereof is made easy. Furthermore, the electrical conductor 27*j* may be made contact with or bonded to the bottom face of the plate 28 via a conductive film.

The electrical conductor 27*j* is disposed so as to be provided with the clearance 27*c* of about 10 mm between the two electrical conductor halves 27*a* and 27*b* in a plane parallel with the bottom face of the object 29 to be heated. The effect of increasing the equivalent series resistance (Rs) is more significant in the case when this clearance 27*c* is not provided. However, in the case when the clearance 27*c* is not provided, the induction current flowing in each of the electrical conductor halves 27*a* and 27*b* is large, whereby the heating value becomes very large and the lowering of the heating efficiency is significant. When the clearance 27*c* is provided, the increase of the equivalent series resistance becomes lower than that in the case when the clearance 27*c* is not provided. However, by providing the clearance 27*c*, the circulating current induced in the electrical conductor 27*j* and flowing opposite to and nearly parallel with the current of the heating coil 21 is prevented from flowing. Hence, an induction current having a different distribution flows eventually in the electrical conductor 27*j*, thereby generating an action of restricting the heat generation of the electrical conductor 27*j* and increasing the equivalent series resistance.

In addition, by providing the clearance 27*c* between the electrical conductor halves 27*a* and 27*b*, the direction and magnitude of the current induced in the electrical conductor 27*j* by the magnetic field generated by the heating coil 21 is changed. Hence, while the effect of decreasing the buoyancy exerted on the object 29 to be heated is maintained to some extent, the heating value generated at the electrical conductor 27*j* can be decreased. In other words, the circulating current induced in the electrical conductor 27*j* and flowing opposite to the current flowing in the heating coil 21 is shut off by the clearance 27*c*. Hence, the current in the electrical conductor 27*j* is limited, and its heating value can be decreased. In that case, the buoyancy-decreasing effect for the object 29 to be heated is lowered to some extent. The magnitude of the equivalent series resistance and the heating value of the electrical conductor 27*j* become different depending on the shape of the clearance 27*c*, the area wherein the magnetic flux of the heating coil 21 intersects, the material of the electrical conductor 27, etc. Hence, by the selection of the optimum combination of these factors, it is preferable that the optimum combination for making the buoyancy-decreasing effect as large as possible and for restricting the heating value of the electrical conductor 27*j* within an allowable range should be determined.

Eighth Embodiment

An induction heating apparatus in accordance with an eighth embodiment of the present invention will be described referring to the above-mentioned FIG. 14, FIG. 15 and FIG. 16.

In the exploded perspective view of FIG. 14, two electrical conductor temperature sensors 49*a* and 49*b* using thermistors or the like are provided on the coil base 22 of the induction heating section 42*a* of the induction heating apparatus in accordance with this embodiment. Convex portions 48*a* and 48*b* protruding from the bottom faces of the electrical conductor halves 27*a* and 27*b* are formed at the extending portions 47*a* and 47*b* of the electrical conductor halves 27*a* and 27*b* having substantially the same configuration as that of the above-mentioned seventh embodiment. In FIG. 14, the convex portions 48*a* and 48*b* are on the bottom faces of the extending portions 47*a* and 47*b* and not visible. Hence, the indication lines for the convex portions 48*a* and 48*b* indicate concave portions formed by the stamping process for forming the convex portions 48*a* and 48*b*. The convex portions 48*a* and 48*b* are provided to enhance the mechanical strength of the extending portions 47*a* and 47*b* and to make contact with the thermal shield plate 30. The thermal shield plates 30 and 31 held by supporters 17 after assembly and serving as heat insulators are provided with extending portions 50*a* and 50*b* at the positions opposed to the convex portions 48*a* and 48*b* of the electrical conductor halves 27*a* and 27*b*, respectively, when assembled.

Figure 15:
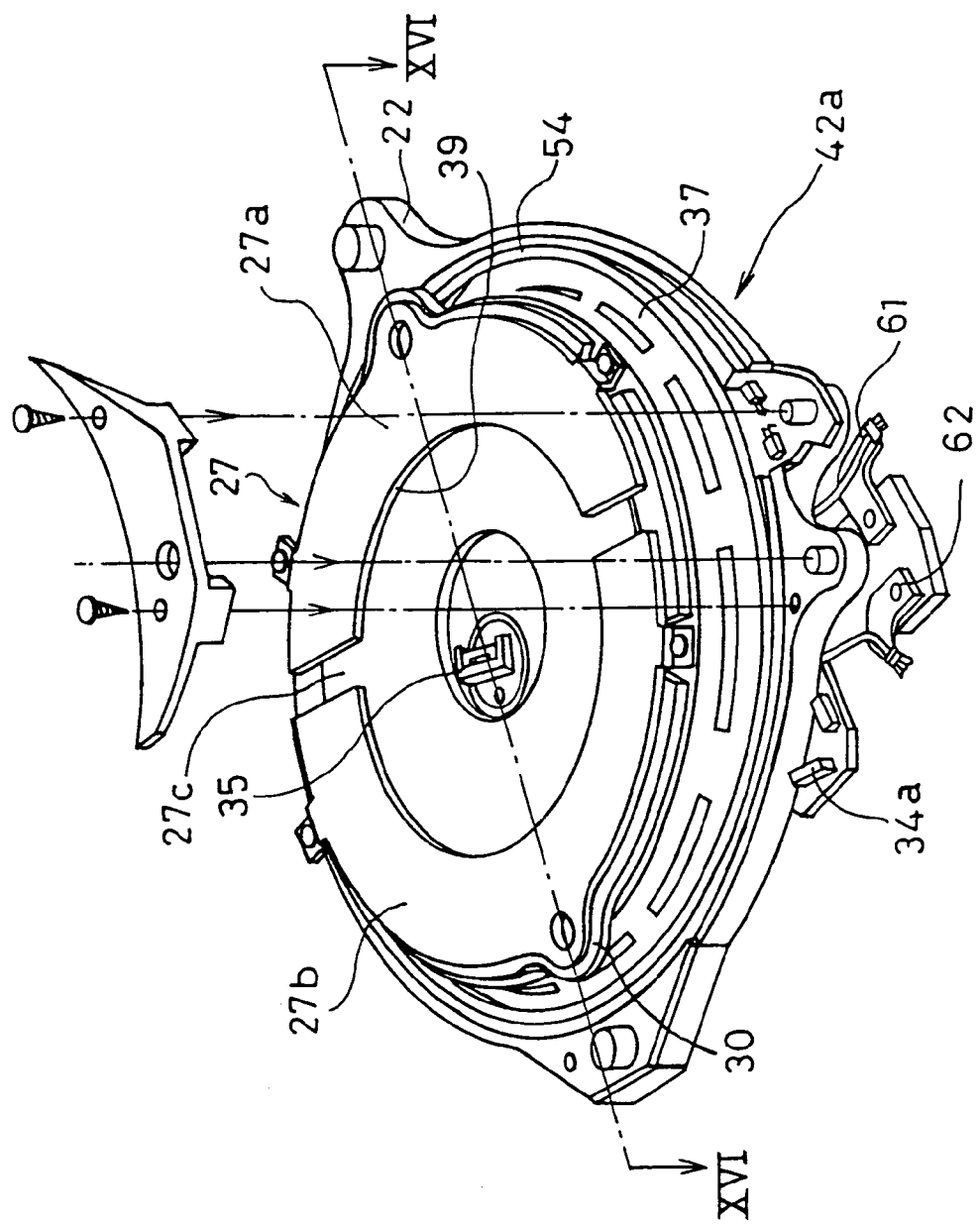
FIG. 15 is an assembled perspective view of the induction heating section in the induction heating apparatus in accordance with the seventh embodiment of the present invention.

FIG. 15 is an assembled perspective view wherein the induction heating section 42*a* shown in FIG. 14 is assembled. FIG. 16 is a cross-sectional view taken on line XVI—XVI of the assembled perspective view of FIG. 15. In FIG. 16, the electrical conductor temperature sensor 49*a* on the right side makes contact with the extending portion 50*a* of the thermal shield plates 30 and 31. The extending portion 50*a* of the thermal shield plates 30 and 31 makes contact with the convex portion 48*a* of the electrical conductor 27*a*, and the extending portion 50*b* makes contact with the convex portion 48*b* of the electrical conductor 27*b*. The other configurations are the same as those of the above-mentioned seventh embodiment shown in FIG. 14.

A heating coil temperature sensor 131 using a thermistor or the like for detecting the temperature of the heating coil 21 via the coil base 22 is installed on the bottom face of the heating coil 21. The heating coil temperature sensor 131 is accommodated in a heat-resistant resin case 132. The other configurations are the same as those of the above-mentioned seventh embodiment shown in FIG. 14. A temperature sensor 35 for the object to be heated, using a thermistor or the like for measuring the temperature of the object 29 to be heated via the plate 28 is provided at a nearly central portion of the coil base 22 so as to be accommodated in a heat-resistant resin case 36.

The basic operation of the induction heating apparatus in accordance with this embodiment is the same as that of the above-mentioned seventh embodiment. In this embodiment, the temperatures of the electrical conductor halves 27*a* and 27*b* are detected by the electrical conductor temperature sensors 49*a* and 49*b*, respectively. As shown in the table of FIG. 19, when either of the temperatures of the electrical conductor halves 27*a* and 27*b* becomes the "first setting condition" (the detection temperature of the electrical conductor temperature sensor 49*a* or 49*b* is 200° C. in the table of FIG. 19) or more, the heating output of a drive circuit 15 is decreased from 2000 W to 1600 W. When the detection temperature of the electrical conductor temperature sensor 49a or 49b becomes 240° C. or more as indicated in the "second setting condition" of the above-mentioned table, an abnormality indication informing the generation of abnormality is carried out, the output of the heating is decreased to zero, whereby the heating is stopped. Hence, the various components of the induction heating apparatus are prevented from being damaged by overheating. In the temperatures detection by the electrical conductor halves 27a and 27b, the first and second setting conditions shown in the table of FIG. 19 may be determined on the basis of the difference between the detection temperatures of the electrical conductor temperature sensors 49a and 49b. In accordance with the table, when the temperature difference reaches 50 K, the first setting condition is applied, and the output of the heating is reduced from 2000 W to 1600 W. When the temperature difference reaches 80 K, the second setting condition is applied, an abnormality indication is carried out on an indication section, which is not shown since it is known, and the heating is stopped.

The overheating of the electrical conductor 27j occurs in the following cases.

Figure 17:
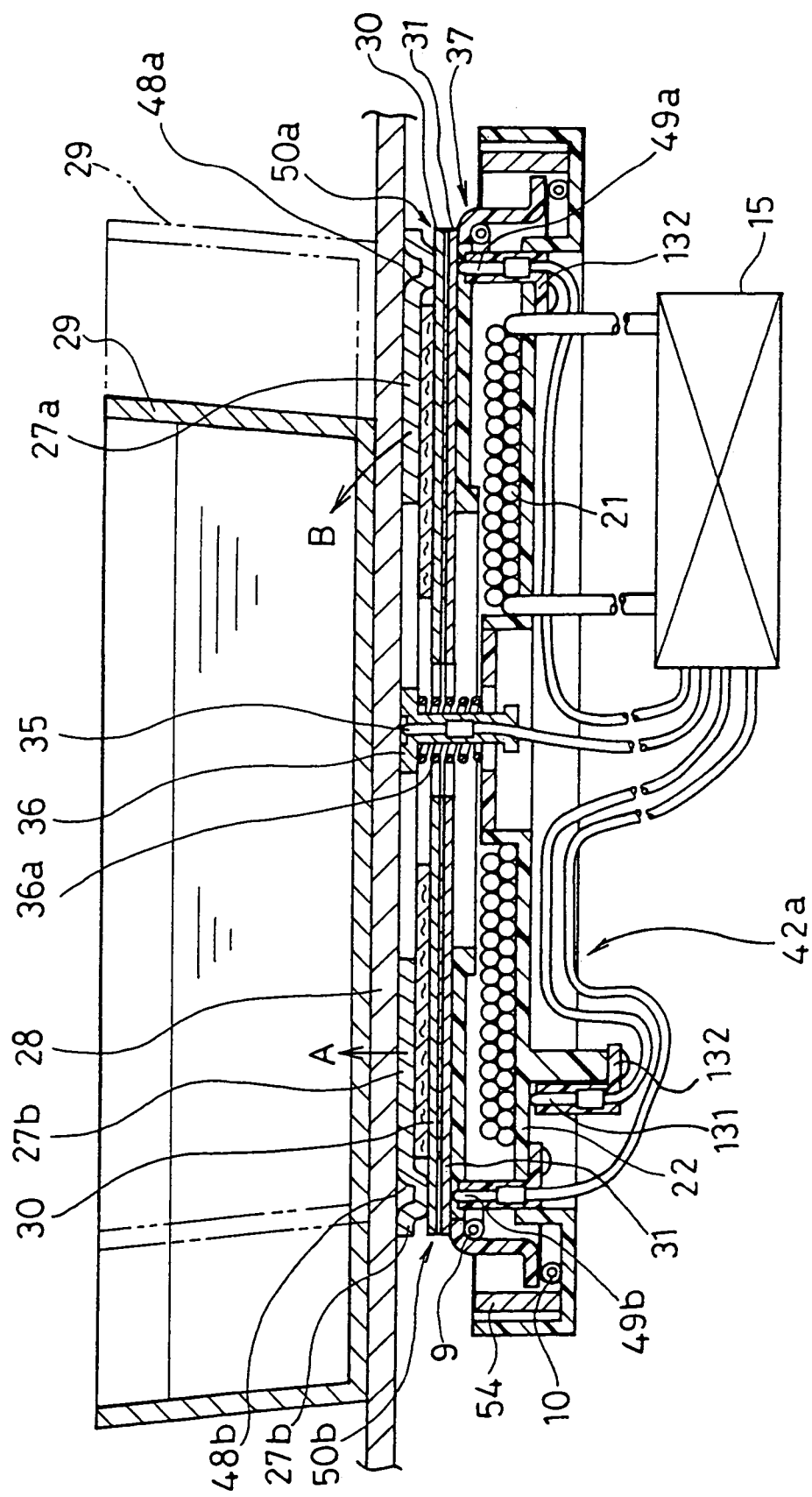
FIG. 17 is a cross-sectional view showing a state wherein an object to be heated is moved in the induction heating apparatus in accordance with the eighth embodiment of the present invention.
Figure 18:
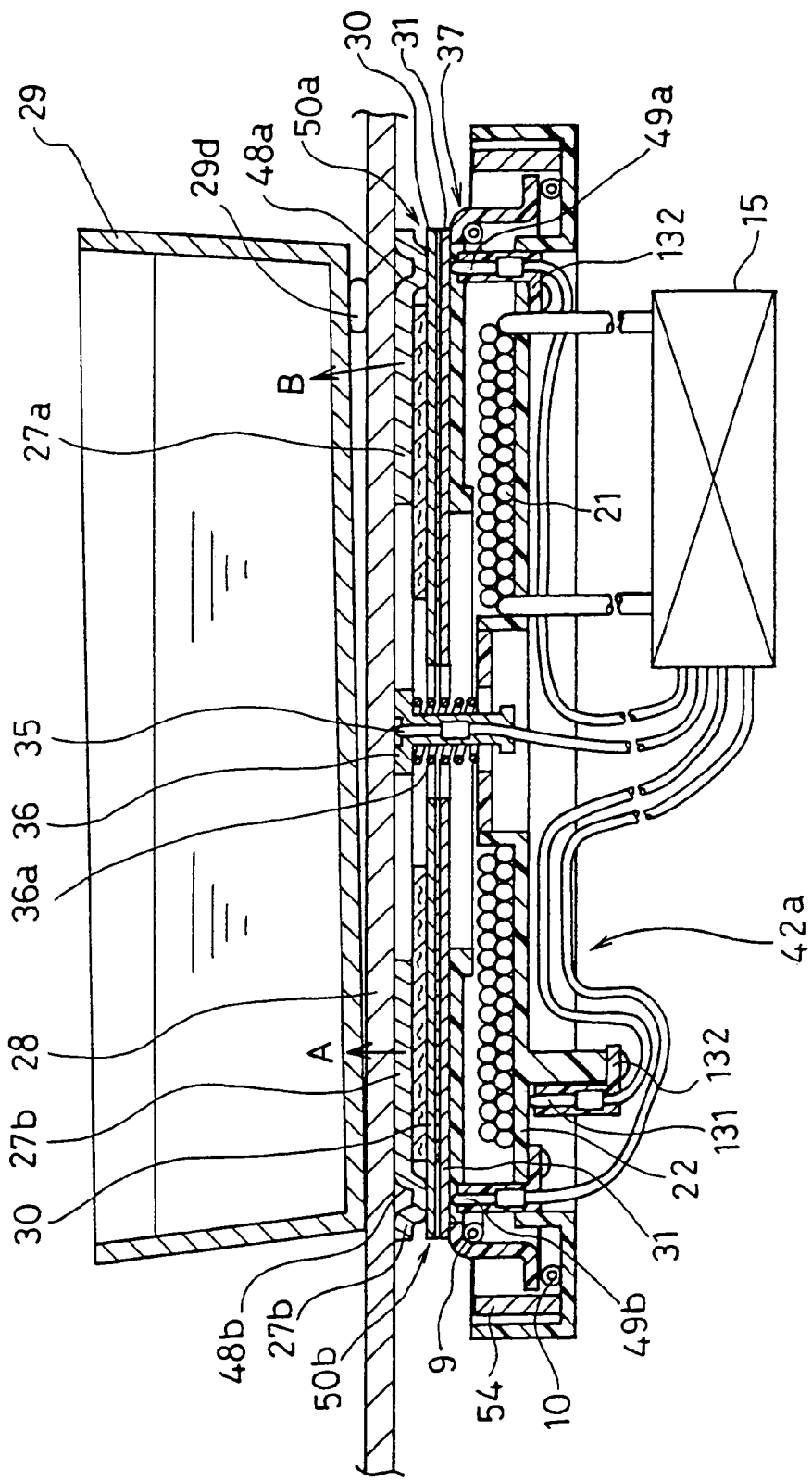
FIG. 18 is a cross-sectional view showing a state wherein an object to be heated is floated in the induction heating apparatus in accordance with the eighth embodiment of the present invention.
Figure 20:
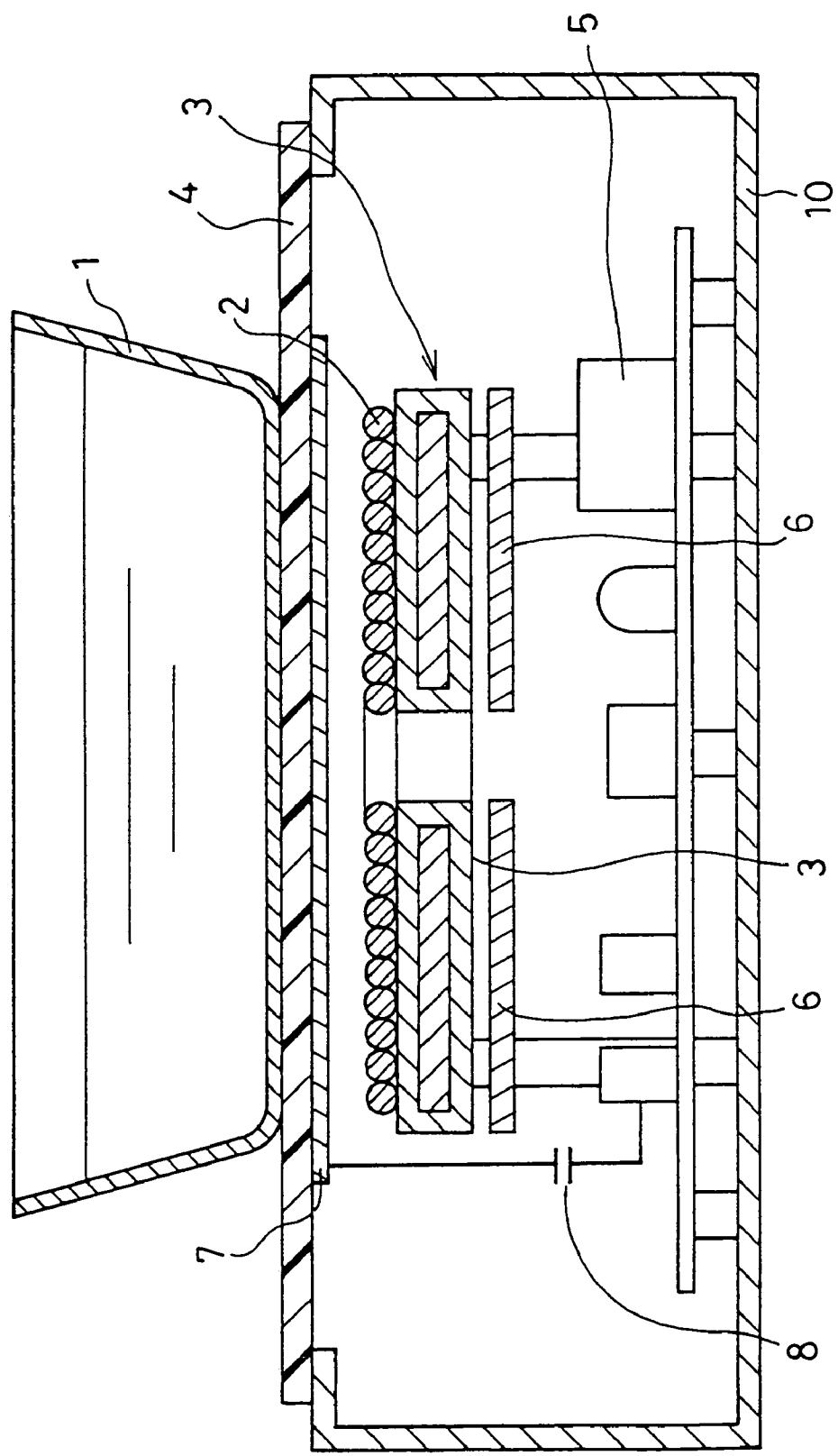
FIG. 20 is a cross-sectional view of the main sections of the conventional induction heating apparatus.
Figure 22:
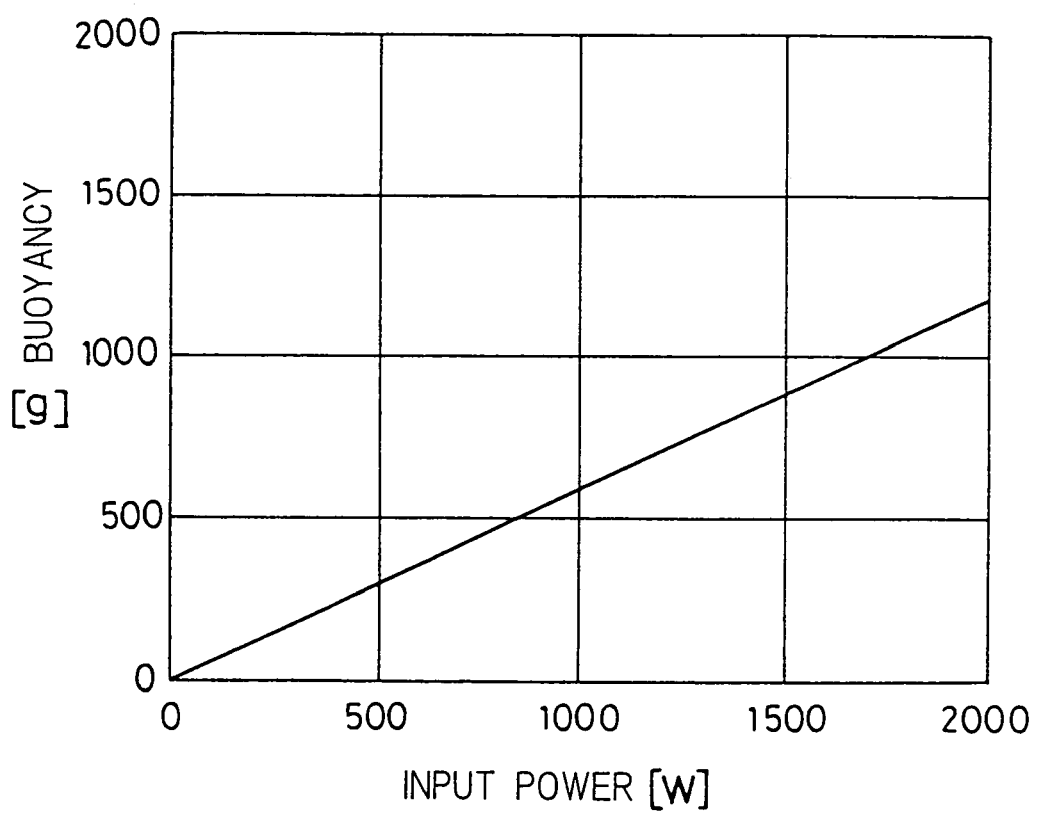
FIG. 22 is a graph showing the relationship between the input power of the heating coil and buoyancy.

FIG. 17 shows a case wherein the object 29 to be heated is dislocated to the left of the figure from the proper position indicated by the chain lines. In this case, the heat of the electrical conductor 27b is transferred to the plate 28 and then to the object 29 to be heated as indicated by arrow A. Hence, the electrical conductor 27b is not overheated. On the other hand, the heat of the electrical conductor 27a on the right side is transferred from its inner circumferential portion to the object 29 to be heated as indicated by arrow B. Since the object 29 to be heated does not exist in the most area of the upper portion of the electrical conductor 27a, the heat dissipation amount of the electrical conductor 27a is small. Hence, the temperature of the electrical conductor 27a rises and may become nearly 400° C. If the electrical conductor 27a has this kind of high temperature, its heat is transferred to the heating coil 21 via the thermal shield plates 30 and 31, thereby heating the heating coil 21. If the temperature of the heating coil 21 becomes 150° C. or more, there is a fear of damaging its covering resin or the like. This kind of situation also occurs in the case when a foreign substance 29d is trapped between the object 29 to be heated and the plate 28 and the object 29 to be heated is floated from the face of the plate 28.as shown in FIG. 18.

The terminal strip 61 connected to the inner circumferential side terminal of the heating coil 21 shown in FIG. 14 is connected to the high-voltage side output terminal of a high-frequency power source (not shown), and the terminal strip 62 connected to the outer circumferential side terminal is connected to the low-voltage side output terminal (circuit ground or the like). Therefore, there is almost no potential difference between the electrical conductor temperature sensors 49a and 49b provided at positions close to the outer circumferential portion of the heating coil 21 and the outer circumferential side winding of the heating coil 21, and their potentials are nearly the same. Hence, even when the insulation performance of the detection sections of the electrical conductor temperature sensors 49a and 49b is not enhanced particularly, there is no fear of becoming improper insulation, whereby the reliability is improved. In particular, in the case when the object 29 to be heated is made of a material having low electrical conductivity and low magnetic permeability, such as aluminum, the voltage on the high-voltage side of the heating coil 21 becomes high; however, by using the above-mentioned configuration, there is no fear of causing improper insulation even when the insulation performance is not particularly enhanced. The terminal strip 61 may be connected to the low-voltage side, and the terminal strip 62 may be connected to the high-voltage side.

The electrical conductor halves 27a and 27b are provided with the extending portions 47a and 47b protruding to the outer circumferential side from the outside diameter of the heating coil 21. On the extending portions 47a and 47b, the convex portions 48a and 48b protruding downward are formed for reinforcement. Since the lower portions of the convex portions 48a and 48b are made contact with the electrical conductor temperature sensors 49a and 49b, respectively, via the heat insulator 59, in the case when the electrical conductor halves 27a and 27b become a high temperature, the heat is transferred to the sensing portions of the electrical conductor temperature sensors 49a and 49b at a certain temperature gradient. Hence, the thermistors at the sensing portions, the heat-resistant resin case 132, etc. can be configured by using materials being low in the temperature of heat resistance.

The heat insulator 59 is used to hardly transfer the heat of the electrical conductor halves 27a and 27b to the coil holder 37 and the heating coil 21, whereby the heating coil 21 and the coil holder 37 are not damaged by heat when the electrical conductor halves 27a and 27b become a high temperature.

Figure 16:
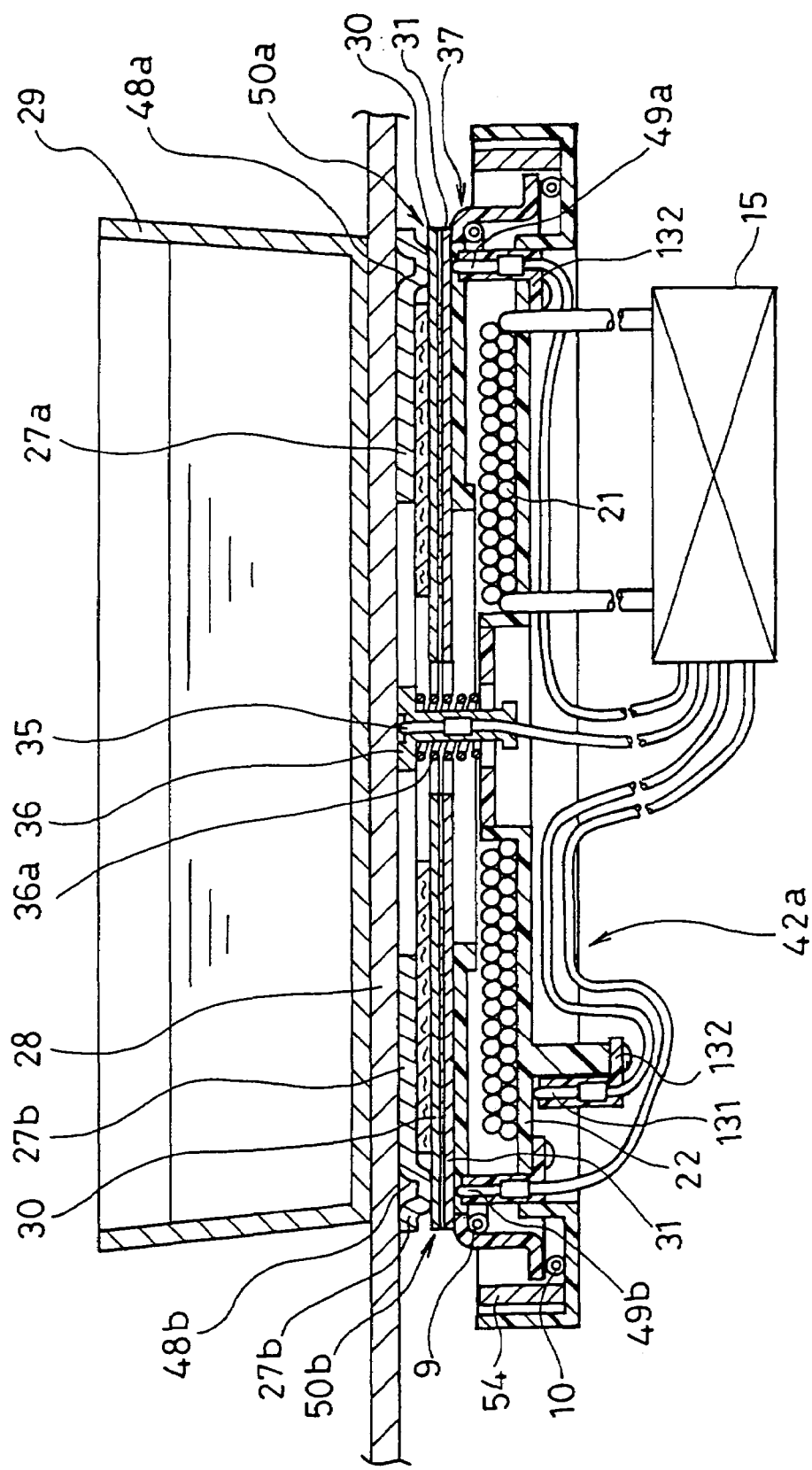
FIG. 16 is a cross-sectional view of an induction heating apparatus in accordance with an eighth embodiment of the present invention.

In this embodiment, as shown in FIG. 16, the heating coil temperature sensor 131 is provided on the bottom face of the coil base 22 for holding the heating coil 21. With this configuration, the heating coil temperature sensor 131 detects the temperature of the heating coil. In the case when the electrical conductor temperature sensors 49a and 49b do not operate because of trouble or the like, the heating coil temperature sensor 131 detects the temperature of the heating coil 21; when a predetermined temperature is reached, the heating output of the drive circuit 15 is lowered or the heating is stopped to protect the heating coil 21.

Furthermore, in this embodiment, the positional relationship of the electrical conductor halves 27a and 27b and the electrical conductor temperature sensors 49a and 49b with respect to the heating coil 21 is always maintained so as to have a constant dimensional relationship on the coil base 22. Hence, the influence of noise or the like from the heating coil 21 on the electrical conductor temperature sensors 49a and 49b becomes constant. Moreover, the heat transfer from the electrical conductor halves 27a and 27b also becomes constant, whereby the detection performance of the electrical conductor temperature sensors 49a and 49b is also stabilized. Still further, since the components provided in the vicinity of the heating coil 21 are integrally assembled on the coil base 22, the assembly performance thereof is high.

Although two electrical conductor halves are provided and one electrical conductor temperature sensor is provided for each of them in this embodiment, the number of the electrical conductors and the number of the electrical conductor temperature sensors may be changed as necessary.

In this embodiment, the inside terminal of the winding of the heating coil 21 is connected to the high-voltage side of the high-frequency power source, the outside terminal is connected to the low-voltage side, and the electrical conductor temperature sensors 49a and 49b are provided outside the heating coil 21. Conversely, the inside terminal of the winding of the heating coil 21 may be connected to the low-voltage side, the outside terminal may be connected to the high-voltage side, and the electrical conductor temperature sensors may be provided inside the heating coil.

INDUSTRIAL APPLICABILITY

The present invention can attain an induction heating apparatus capable of heating an object to be heated which is made of a material having low magnetic permeability and high electrical conductivity, such as aluminum and copper, capable of decreasing losses in internal components, such as a heating coil, during heating, and capable of decreasing the buoyancy exerted on the object to be heated.

In the induction heating apparatus for heating the object to be heated which is made of a material having low magnetic permeability and high electrical conductivity, such as aluminum and copper, an electrical conductor is provided between the heating coil and the object to be heated, whereby the buoyancy exerted on the object to be heated can be decreased and the temperature rise of the electrical conductor can be restricted.

In addition, the tilting or sliding of the object to be heated owing to the buoyancy exerted nonuniformly on the object to be heated can be prevented. Furthermore, the distortion of the leakage magnetic field distribution owing to the electrical conductor can be relieved.

Even if the object to be heated which is made of aluminum is lightweight, it is not floated, whereby heating by sufficient input power can be ensured. Furthermore, even in the case when the object to be heated which is made of aluminum is dislocated with respect to the above-mentioned electrical conductor or when a foreign substance is trapped between the object to be heated which is made of aluminum and the plate, the electrical conductor is prevented from becoming a high temperature, whereby it is possible to configure an induction heating apparatus capable of preventing the heating coil and the like from being damaged.

The invention claimed is:

1. An induction heating apparatus comprising a heating coil capable of induction heating an object to be heated which is made of a low magnetic permeability material having an electrical conductivity nearly equal to or higher than that of aluminum or copper, and an electrical conductor provided between said heating coil and said object to be heated, wherein said electrical conductor makes the equivalent series resistance of said heating coil at the time when said object to be heated is disposed so as to be opposed to said heating coil larger than the equivalent series resistance of said heating coil at the time when said electrical conductor is not provided.

2. An induction heating apparatus comprising a heating coil capable of induction heating an object to be heated which is made of a low magnetic permeability material having an electrical conductivity nearly equal to or higher than that of aluminum or copper, and an electrical conductor provided between said heating coil and said object to be heated, wherein when said object to be heated is disposed so as to be opposed to said heating coil, said electrical conductor has a buoyancy-decreasing function of decreasing the buoyancy caused by the action of the magnetic field generated from said heating coil and the induction current induced in said object to be heated and exerted on said object to be heated.

3. An induction heating apparatus in accordance with claim 1 or 2, wherein said electrical conductor is formed of a plate-like member opposed to part or the whole of said heating coil.

4. An induction heating apparatus in accordance with claim 3, wherein said electrical conductor is formed so as to cover portions other than the central portion of said heating coil or the vicinity thereof.

5. An induction heating apparatus in accordance with claim 3, further comprising a circulating current limiting portion for limiting the distribution of the induction current flowing so as to circulate in said electrical conductor in a direction nearly parallel with the direction of the current flowing in said heating coil.

6. An induction heating apparatus in accordance with claim 5, wherein said circulating current limiting portion has at least one selected from among a notch, an opening and a slit formed in said electrical conductor, and limits the distribution of the induction current flowing so as to circulate in said electrical conductor in a direction nearly parallel with the direction of the current of said heating coil.

7. An induction heating apparatus in accordance with claim 1 or 2, having a plurality of electrical conductors disposed with intervals among them.

8. An induction heating apparatus in accordance with claim 1 or 2, wherein the thickness of said electrical conductor is made larger than the permeable depth of the high-frequency current induced by the current of said heating coil.

9. An induction heating apparatus in accordance with claim 1 or 2, wherein said electrical conductor is made of a material having low magnetic permeability.

10. An induction heating apparatus in accordance with claim 1 or 2, wherein said electrical conductor is made of a material having high electrical conductivity.

11. An induction heating apparatus in accordance with claim 1 or 2, having a main body accommodating said heating coil, and an insulator secured to said main body so as to be positioned between said heating coil and said object to be heated, wherein said electrical conductor is provided on the heating coil side of said insulator.

12. An induction heating apparatus in accordance with claim 1 or 2, further comprising magnetic bodies having high magnetic permeability provided under said heating coil, wherein said magnetic bodies have rising portions rising toward said object to be heated in the vicinity of the under side of the outer circumference or outside the outer circumference of said electrical conductor.

13. An induction heating apparatus in accordance with claim 1 or 2, wherein said electrical conductor has an opening portion at the central portion thereof, magnetic bodies having high magnetic permeability are provided on the side of said heating coil in which said object to be heated is not provided, and said magnetic bodies have rising portions rising toward said object to be heated in the vicinity of the circumferential portion of said opening portion of said electrical conductor or on the central side from the circumferential portion of said opening portion.

14. An induction heating apparatus in accordance with claim 1 or 2, having a main body accommodating said heating coil, and an insulator secured to said main body so as to be positioned between said heating coil and said object to be heated, wherein said electrical conductor is provided on the object-to-be-heated side of said insulator.

15. An induction heating apparatus in accordance with claim 14, wherein said electrical conductor has an attachment integrally provided with said electrical conductor, and the total weight of said electrical conductor and said attachment is set at a weight wherein said electrical conductor and said attachment are not floated at the time which is heated by said heating coil.

16. An induction heating apparatus in accordance with claim 1 or 2, wherein said electrical conductor is thermally connected to said object to be heated.

17. An induction heating apparatus in accordance with claim 1 or 2, wherein said electrical conductor is mechanically connected to said object to be heated.

18. An induction heating apparatus in accordance with claim 14, wherein a temperature detector is provided on the heating coil side of said insulator, and said electrical conductor is thermally connected to said temperature detector via said insulator.

19. An induction heating apparatus comprising:
a heating coil for induction heating an object to be heated which is made of a low magnetic permeability material having an electrical conductivity nearly equal to or higher than that of aluminum or copper,
a nonmagnetic plate having electrical insulation performance on which said object to be heated is placed, and
an electrical conductor provided between said heating coil and said plate, at least part of which makes contact with said plate directly or via a member having thermal conductivity, and which increases the equivalent series resistance of said heating coil when said object to be heated is disposed so as to be opposed to said heating coil.

20. An induction heating apparatus comprising:
a heating coil for induction heating an object to be heated which is made of a low magnetic permeability material having an electrical conductivity nearly equal to or higher than that of aluminum or copper,
a nonmagnetic plate having electrical insulation performance on which said object to be heated is placed, and
an electrical conductor provided between said heating coil and said plate, at least part of which makes contact with said plate directly or via a member having thermal conductivity, and which gives an action of decreasing the buoyancy caused by the action of the magnetic field generated by said heating coil and the induction current induced in said object to be heated and exerted on said object to be heated when said object to be heated is disposed so as to be opposed to said heating coil.

21. An induction heating apparatus in accordance with claim 19 or 20, wherein said electrical conductor is bonded to the face of said plate on the opposite side of the face on which said object to be heated is placed.

22. An induction heating apparatus in accordance with claim 19 or 20, wherein said electrical conductor is inserted between said plate and an heat insulator having elasticity and thermal insulation performance, and pressed toward said plate by said heat insulator.

23. An induction heating apparatus comprising:
a heating coil for induction heating an object to be heated which is made of a low magnetic permeability material having an electrical conductivity nearly equal to or higher than that of aluminum or copper,
a nonmagnetic plate having electrical insulation performance on which said object to be heated is placed, and
a plurality of electrical conductors having a predetermined width, having a shape nearly conforming to the winding direction of the winding of said heating coil, and provided between said heating coil and said plate with intervals among them, which increase the equivalent series resistance of said heating coil when said object to be heated is disposed so as to be opposed to said heating coil.

24. An induction heating apparatus comprising:
a heating coil for induction heating an object to be heated which is made of a low magnetic permeability material having an electrical conductivity nearly equal to or higher than that of aluminum or copper,
a nonmagnetic plate having electrical insulation performance on which said object to be heated is placed, and
a plurality of electrical conductors having a predetermined width, having a shape nearly conforming to the winding direction of the winding of said heating coil, and provided between said heating coil and said plate with intervals among them, which give an action of decreasing the buoyancy caused by the action of the magnetic field generated by said heating coil and the induction current induced in said object to be heated and exerted on said object to be heated when said object to be heated is disposed so as to be opposed to said heating coil.

25. An induction heating apparatus in accordance with claim 23 or 24, wherein said plurality of electrical conductors have a nearly (substantially) uniform size, and the intervals among them are nearly uniform.

26. An induction heating apparatus in accordance with any one of claims 19, 20, 23, and 24, wherein
said plate on which said object to be heated is placed is provided while having a predetermined interval from said heating coil,
a plurality of electrical conductors are provided between said heating coil and said plate and dividedly disposed with intervals among them, and magnetic bodies for magnetic shielding are provided under said heating coil, and
said electrical conductors increase the equivalent series resistance of said heating coil when said object to be heated is disposed so as to be opposed to said heating coil, and said magnetic bodies are disposed away from the positions opposed to said intervals provided among said plurality of electrical conductors.

27. An induction heating apparatus in accordance with any one of claims 19, 20, 23, and 24, wherein
said plate on which said object to be heated is placed is provided while having a predetermined interval from said heating coil,
a plurality of electrical conductors are provided between said heating coil and said plate and dividedly disposed with intervals among them, and magnetic bodies for magnetic shielding are provided under said heating coil, and
said electrical conductors generate an function of decreasing the buoyancy caused by the action of the magnetic field generated by said heating coil and the induction current induced in said object to be heated and exerted on said object to be heated when said object to be heated is disposed so as to be opposed to said heating coil, and said magnetic bodies are disposed away from the positions opposed to said intervals provided among said plurality of electrical conductors.

28. An induction heating apparatus comprising:
a heating coil for induction heating an object to be heated which is made of a low magnetic permeability material having an electrical conductivity nearly equal to or higher than that of aluminum or copper,
a nonmagnetic plate having electrical insulation performance on which said object to be heated is placed,
a plurality of electrical conductors provided between said heating coil and said plate with intervals among them, which increase the equivalent series resistance of said heating coil when said object to be heated is disposed so as to be opposed to said heating coil, a first magnetic body for magnetic shielding disposed at a position very close to and on the opposite side of the side, opposed to said electrical conductors, of said heating coil, and a second magnetic body provided at a position further away from said heating coil than said first magnetic body, wherein the distortion of the distribution of said magnetic field owing to the intervals among said plurality of electrical conductors is relieved.

29. An induction heating apparatus comprising:

a heating coil for induction heating an object to be heated which is made of a low magnetic permeability material having an electrical conductivity nearly equal to or higher than that of aluminum or copper, a nonmagnetic plate having electrical insulation performance on which said object to be heated is placed, a plurality of electrical conductors provided between said heating coil and said plate with intervals among them, which give an action of decreasing the buoyancy caused by the magnetic field generated by said heating coil and exerted on said object to be heated when said object to be heated is disposed so as to be opposed to said heating coil, a first magnetic body for magnetic shielding disposed at a position very close to and on the opposite side of the side, opposed to said electrical conductors, of said heating coil, and a second magnetic body provided at a position further away from said heating coil than said first magnetic body, wherein the distortion of the distribution of said magnetic field owing to the intervals among said plurality of electrical conductors is relieved.

30. An induction heating apparatus comprising:

a heating coil for induction heating an object to be heated which is made of a low magnetic permeability material having an electrical conductivity nearly equal to or higher than that of aluminum or copper, a nonmagnetic plate having electrical insulation performance on which said object to be heated is placed, and at least one electrical conductor provided between said heating coil and said plate, at least part of which makes contact with said plate directly or via a member having thermal conductivity, and which increases the equivalent series resistance of said heating coil when said object to be heated is disposed so as to be opposed to said heating coil, an electrical conductor temperature sensor for detecting the temperature of said electrical conductor, and a control section for decreasing the output of a drive circuit for supplying a high-frequency current to said heating coil when the temperature detected by said electrical conductor temperature sensor becomes a predetermined temperature or more.

31. An induction heating apparatus comprising:

a heating coil for induction heating an object to be heated which is made of a low magnetic permeability material having an electrical conductivity nearly equal to or higher than that of aluminum or copper, a nonmagnetic plate having electrical insulation performance on which said object to be heated is placed, and at least one electrical conductor provided between said heating coil and said plate, at least part of which makes contact with said plate directly or via a member having thermal conductivity, and which gives an action of decreasing the buoyancy caused by the magnetic field generated by said heating coil and exerted on said object to be heated when said object to be heated is disposed so as to be opposed to said heating coil, an electrical conductor temperature sensor for detecting the temperature of said electrical conductor, and a control section for decreasing the output of a drive circuit for supplying a high-frequency current to said heating coil when the temperature detected by said electrical conductor temperature sensor becomes a predetermined temperature or more.

32. An induction heating apparatus comprising:

a heating coil for induction heating an object to be heated which is made of a low magnetic permeability material having an electrical conductivity nearly equal to or higher than that of aluminum or copper, the coil wire thereof being wound in a spiral form, a nonmagnetic plate having electrical insulation performance on which said object to be heated is placed, at least one electrical conductor provided between said heating coil and said plate, which increases the equivalent series resistance of said heating coil when said object to be heated is disposed so as to be opposed to said heating coil, an electrical conductor temperature sensor for detecting the temperature of said electrical conductor, which is provided in the vicinity of said heating coil and on the inner circumferential side or the outer circumferential side of said heating coil, whichever having a smaller potential difference, and a control section for decreasing the output of a drive circuit for supplying a high-frequency current to said heating coil when the temperature detected by said electrical conductor temperature sensor becomes a predetermined temperature or more.

33. An induction heating apparatus comprising:

a heating coil for induction heating an object to be heated which is made of a low magnetic permeability material having an electrical conductivity nearly equal to or higher than that of aluminum or copper, the coil wire thereof being wound in a spiral form, a nonmagnetic plate having electrical insulation performance on which said object to be heated is placed, at least one electrical conductor provided between said heating coil and said plate, which gives an action of decreasing the buoyancy caused by the magnetic field generated by said heating coil and exerted on said object to be heated when said object to be heated is disposed so as to be opposed to said heating coil, an electrical conductor temperature sensor for detecting the temperature of said electrical conductor, which is provided in the vicinity of said heating coil and on the inner circumferential side or the outer circumferential side of said heating coil, whichever having a smaller potential difference, and a control section for decreasing the output of a drive circuit for supplying a high-frequency current to said heating coil when the temperature detected by said electrical conductor temperature sensor becomes a predetermined temperature or more.

34. An induction heating apparatus in accordance with any one of claims 30, 31, 32 and 33, wherein when the highest temperature among the detection temperatures of said plurality of electrical conductor temperature sensors becomes a predetermined temperature or more, the output of the drive circuit for supplying a high-frequency current to said heating coil is decreased, and the temperature of said electrical conductor is lowered.

35. An induction heating apparatus in accordance with any one of claims 30, 31, 32, and 33, wherein when the difference among the detection temperatures of said plurality of electrical conductor temperature sensors becomes a predetermined value or more, the output of the drive circuit for supplying a high-frequency current to said heating coil is decreased.

36. An induction heating apparatus in accordance with any one of claims 30, 31, 32, and 33, wherein a heat insulator is provided on the bottom face of said electrical conductor, and said electrical conductor temperature sensors are made contact with the bottom face of said heat insulator.

37. An induction heating apparatus in accordance with any one of claims 30, 31, 32, and 33, wherein said electrical conductor temperature sensors are made contact with extending portions, provided on the inner circumferential side or the outer circumferential side of said electrical conductor, directly or via a heat insulator.

38. An induction heating apparatus in accordance with any one of claims 30, 31, 32, and 33, wherein a coil base for holding said heating coil is provided under said heating coil, and a coil holder for holding said heating coil is provided above said heating coil, said electrical conductor is installed on said coil holder directly or via a heat insulator, said electrical conductor temperature sensors are installed on said coil base, and said electrical conductor temperature sensors are made contact with said electrical conductor directly or via said heat insulator.

39. An induction heating apparatus in accordance with any one of claims 30, 31, 32, and 33, wherein a heating coil temperature sensor for detecting the temperature of said heating coil is installed on the bottom face of said heating coil, and when the detection value of said heating coil temperature sensor becomes a predetermined temperature or more, the output of the drive circuit for supplying a high-frequency current to said heating coil is decreased.

* * * * *